(12) United States Patent
Li

(10) Patent No.: US 10,447,660 B2
(45) Date of Patent: Oct. 15, 2019

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Shaolong Li, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 15/359,299

(22) Filed: Nov. 22, 2016

(65) Prior Publication Data
US 2017/0155626 A1 Jun. 1, 2017

(30) Foreign Application Priority Data

Nov. 28, 2015 (JP) .................................. 2015-232512

(51) Int. Cl.
*G06F 21/00* (2013.01)
*H04L 29/06* (2006.01)
*H04L 9/08* (2006.01)
*H04L 9/32* (2006.01)

(52) U.S. Cl.
CPC ........ *H04L 63/0428* (2013.01); *H04L 9/0861* (2013.01); *H04L 9/3268* (2013.01); *H04L 63/0442* (2013.01); *H04L 63/0823* (2013.01)

(58) Field of Classification Search
CPC ............. H04L 63/0428; H04L 63/0823; H04L 63/0442; H04L 9/0861; H04L 9/3268
See application file for complete search history.

(56) References Cited

U.S. PATENT DOCUMENTS

2001/0034834 A1* 10/2001 Matsuyama .......... H04L 9/3268
713/156
2010/0275024 A1* 10/2010 Abdulhayoglu .... G06F 21/6218
713/175

FOREIGN PATENT DOCUMENTS

| JP | 2013-143762 A |   | 7/2013 |
| JP | 2013143762 A | * | 7/2013 |

* cited by examiner

*Primary Examiner* — Kendall Dolly
(74) *Attorney, Agent, or Firm* — Canon U.S.A., Inc. IP Division

(57) ABSTRACT

An apparatus includes a memory device that stores a set of instructions, and at least one processor that executes the instructions to perform control to cause a storage unit to store a digital certificate issued by a certification authority, release a public key whose validity is certified by the digital certificate and perform encrypted communication with an external apparatus using the public key, and transmit, to the certification authority, an acquisition request for revocation information about digital certificates in a case where a predetermined condition is satisfied.

16 Claims, 18 Drawing Sheets

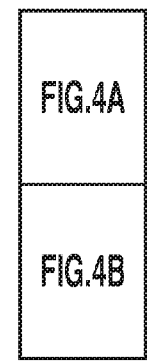
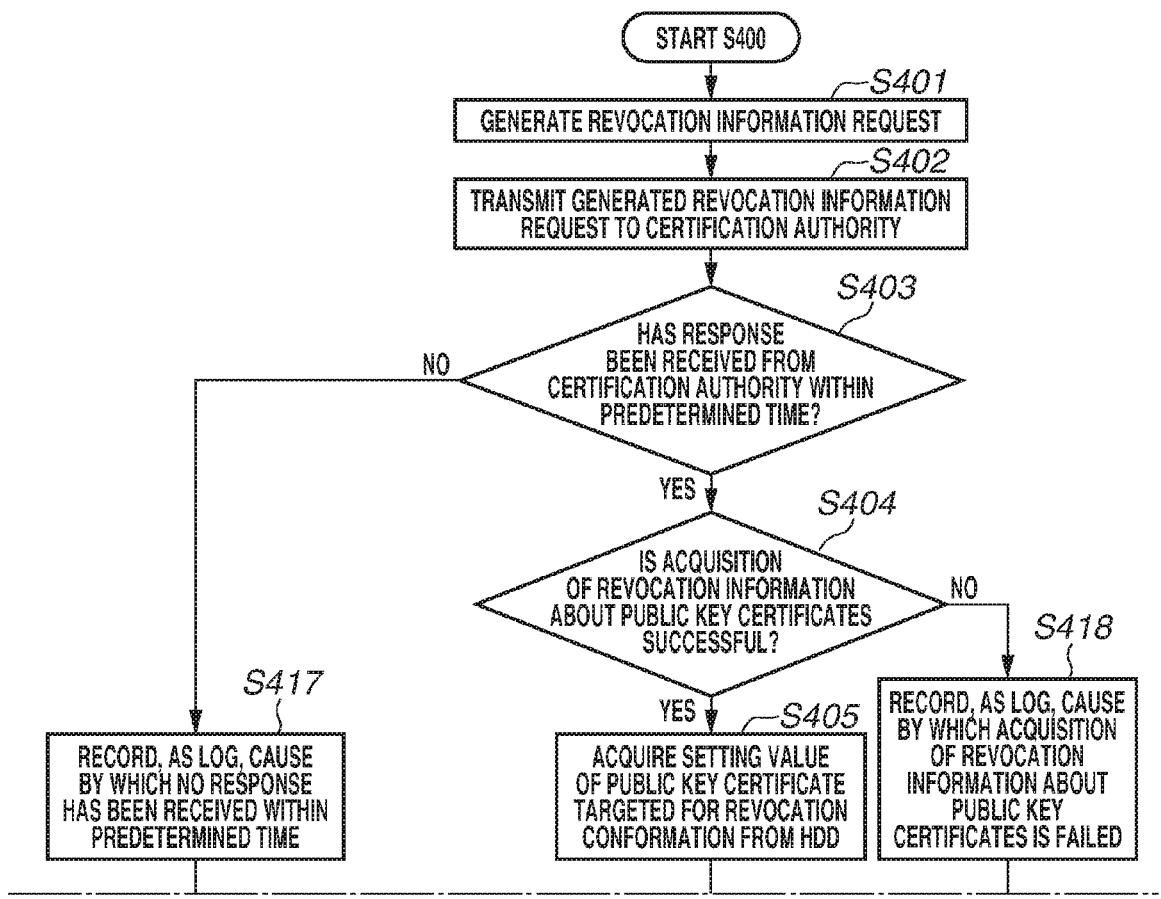

FIG.6A

MANAGEMENT TABLE FOR PUBLIC KEY CERTIFICATES (600)

| No. | NAME | USAGE | REVOCATION FLAG | ISSUER | EXPIRATION DATE | SERIAL NUMBER |
|---|---|---|---|---|---|---|
| 1 | Cert1 | SSL | TRUE | ZyyxxCA | 2017/03/01 | 11211e8554fcb1c9e949ce41fa7413382811 |
| 2 | Cert2 | IEEE802.1X | FALSE | ZyyxxCA | 2019/10/11 | 11211e8554fcb1c9e949ce41fa7413382812 |
| 3 | Cert3 | IPSec | FALSE | ZyyxxCA | 2024/02/02 | 11211e8554fcb1c9e949ce41fa7413382813 |
| 4 |  |  |  |  |  |  |
| 5 |  |  |  |  |  |  |

FIG.6B

MANAGEMENT TABLE FOR PUBLIC KEY CERTIFICATES (600)

| No. | NAME | USAGE | REVOCATION FLAG | ISSUER | EXPIRATION DATE | SERIAL NUMBER |
|---|---|---|---|---|---|---|
| 1 | Cert4 | SSL | FALSE | ZyyxxCA | 2020/03/01 | 11211e8554fcb1c9e949ce41fa7413382814 |
| 2 | Cert2 | IEEE802.1X | FALSE | ZyyxxCA | 2019/10/11 | 11211e8554fcb1c9e949ce41fa7413382812 |
| 3 | Cert3 | IPSec | FALSE | ZyyxxCA | 2024/02/02 | 11211e8554fcb1c9e949ce41fa7413382813 |
| 4 |  |  |  |  |  |  |
| 5 |  |  |  |  |  |  |

FIG.6C

MANAGEMENT TABLE FOR PUBLIC KEY CERTIFICATES (600)

| No. | NAME | USAGE | REVOCATION FLAG | ISSUER | EXPIRATION DATE | SERIAL NUMBER |
|---|---|---|---|---|---|---|
| 1 | Cert1 | — | TRUE | ZyyxxCA | 2017/03/01 | 11211e8554fcb1c9e949ce41fa7413382811 |
| 2 | Cert2 | IEEE802.1X | FALSE | ZyyxxCA | 2019/10/11 | 11211e8554fcb1c9e949ce41fa7413382812 |
| 3 | Cert3 | IPSec | FALSE | ZyyxxCA | 2024/02/02 | 11211e8554fcb1c9e949ce41fa7413382813 |
| 4 | Cert4 | SSL | FALSE | ZyyxxCA | 2020/03/01 | 11211e8554fcb1c9e949ce41fa7413382814 |
| 5 |  |  |  |  |  |  |

FIG.7

| SELECTION | PUBLIC KEY CERTIFICATE TARGETED FOR REVOCATION CONFIRMATION |
|---|---|
| ○ | ALL PUBLIC KEY CERTIFICATES RETAINED |
| ● | PUBLIC KEY CERTIFICATE THAT IS USED DURING COMMUNICATION |

SETTING OF PUBLIC KEY CERTIFICATE TARGETED FOR REVOCATION CONFIRMATION

SET

FIG.11A

LIST OF PUBLIC KEY CERTIFICATES REGISTERED WITH MFP

| NAME | USAGE | ISSUER | EXPIRATION DATE | STATE |
|---|---|---|---|---|
| Cert4 | SSL | ZyyxxCA | 2020/03/01 | VALID |
| Cert2 | IEEE802.1x | ZyyxxCA | 2019/10/11 | VALID |
| Cert3 | IPSec | ZyyxxCA | 2024/02/02 | VALID |

FIG.11B

LIST OF PUBLIC KEY CERTIFICATES REGISTERED WITH MFP

| NAME | USAGE | ISSUER | EXPIRATION DATE | STATE |
|---|---|---|---|---|
| Cert1 | — | ZyyxxCA | 2017/03/01 | REVOKED |
| Cert2 | IEEE802.1x | ZyyxxCA | 2019/10/11 | VALID |
| Cert3 | IPSec | ZyyxxCA | 2024/02/02 | VALID |
| Cert4 | SSL | ZyyxxCA | 2020/03/01 | VALID |

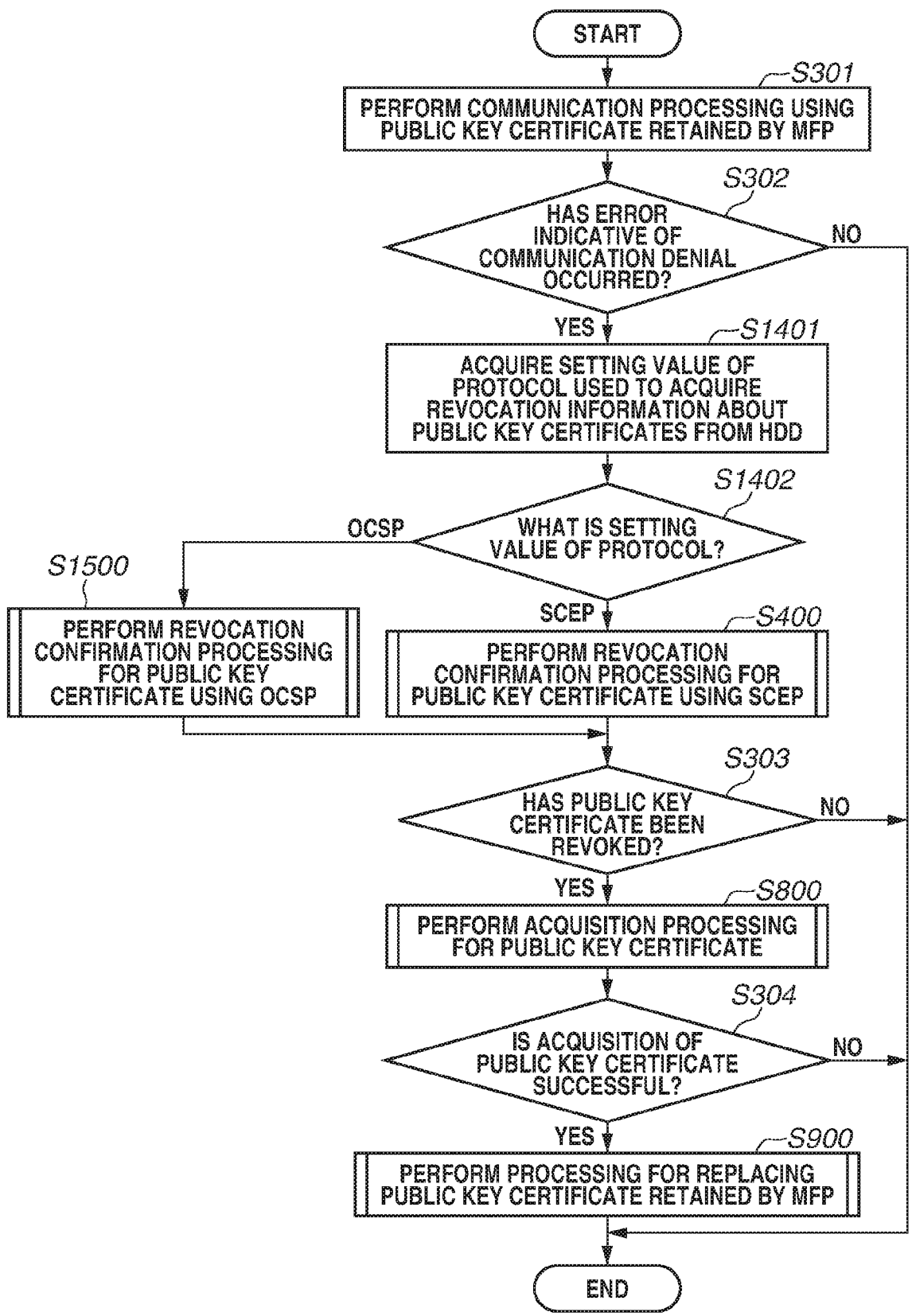

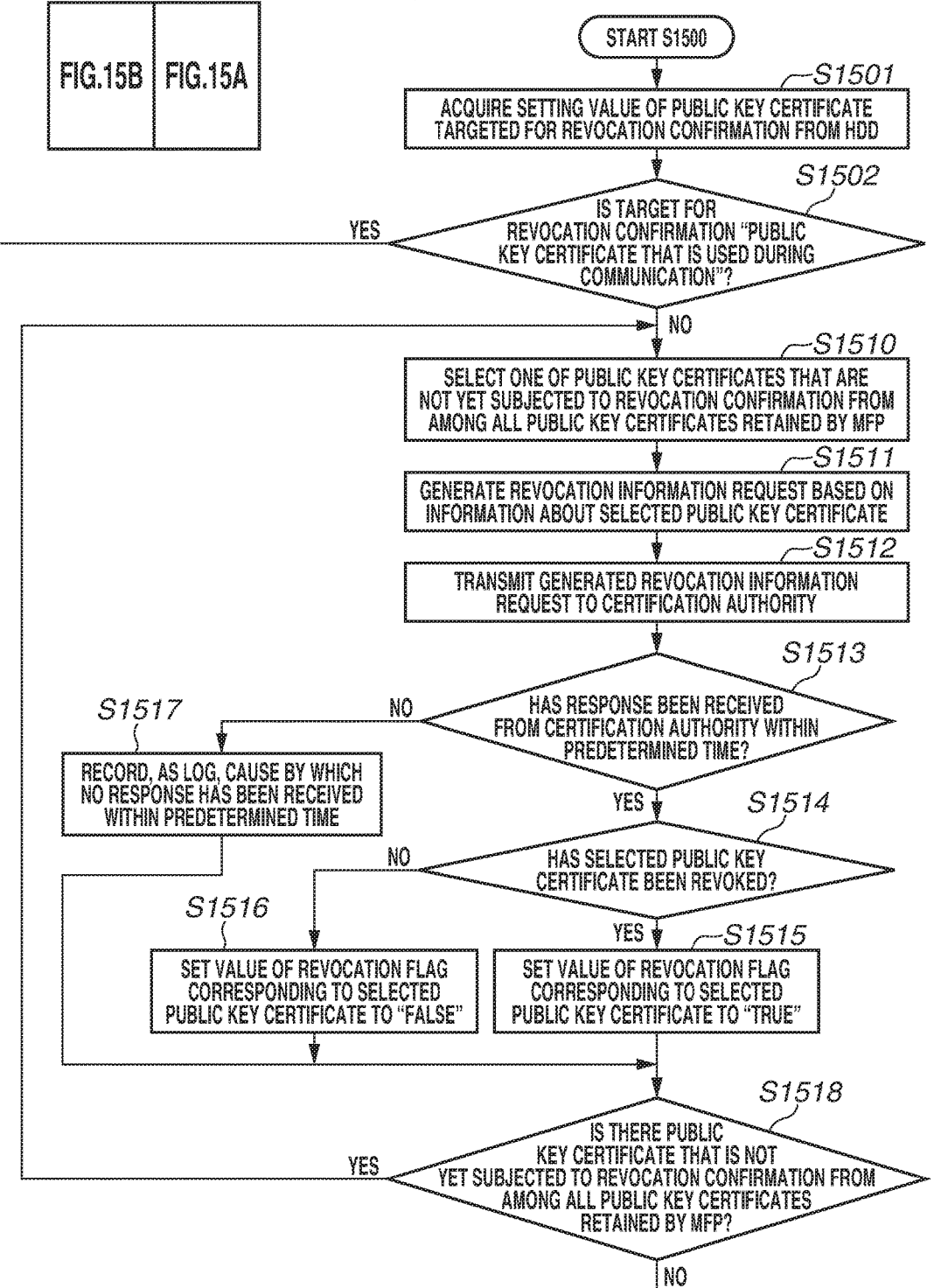

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

Aspects of the embodiments generally relate to an information processing apparatus, a control method for an information processing apparatus, and a storage medium.

Description of the Related Art

An information processing apparatus retains, in a retention unit, a digital certificate signed by a certification authority and issued by the certification authority. Then, the information processing apparatus transmits the digital certificate retained by the retention unit to an external apparatus so as to perform secure communication. Following that, the external apparatus inquires of the certification authority about the digital certificate transmitted by the information processing apparatus and determines whether the information processing apparatus is justifiable as a communication partner. Then, when determining that the information processing apparatus is justifiable as a communication partner, the external apparatus performs secure communication with the information processing apparatus.

An administrator of the certification authority may revoke a digital certificate issued by the certification authority even if the expiration date of the digital certificate has not yet passed. For example, in a case where a private key that is paired with a public key contained in a public key certificate issued by the certification authority has been leaked to the outside of the information processing apparatus, the administrator of the certification authority, when knowing that the private key has been leaked to the outside of the information processing apparatus, revokes the public key certificate.

A verification server discussed in Japanese Patent Application Laid-Open No. 2013-143762 sets update timing (for example, the first day of each month) of revocation information about public key certificates for each certification authority. Then, when a previously-set update timing has been reached, the verification server transmits, to the corresponding certification authority, an acquisition request for revocation information about public key certificates.

The administrator of the certification authority communicates, by e-mail, by telephone, or orally, information indicating that the administrator has revoked a digital certificate retained by an information processing apparatus to the owner of the revoked digital certificate (in other words, the administrator of the information processing apparatus). Then, the administrator of the information processing apparatus, when informed that the digital certificate retained by the information processing apparatus has been revoked, operates an operation unit of the information processing apparatus to perform an operation to replace the revoked digital certificate, which is retained by the information processing apparatus, by a valid digital certificate. Unless the operation to replace the revoked digital certificate by a valid digital certificate is performed by the administrator of the information processing apparatus, the information processing apparatus may attempt to perform secure communication with an external apparatus while directly using the revoked digital certificate. On the other hand, the external apparatus inquires of the certification authority about the digital certificate transmitted by the information processing apparatus and determines whether the information processing apparatus is justifiable as a communication partner. Then, since the digital certificate transmitted by the information processing apparatus has already been revoked, the external apparatus determines that the information processing apparatus is not justifiable as a communication partner. At this time, an error notification indicative of communication denial is sent from the external apparatus to the information processing apparatus as a response. However, the information processing apparatus is not notified by the external apparatus so far of the cause by which an error indicative of communication denial has occurred.

Examples of the cause by which an error indicative of communication denial occurs include, in addition to a digital certificate having been revoked, a cryptographic algorithm or encryption strength for use in cryptographic communication not satisfying a condition set in the external apparatus. Moreover, the cause by which an error indicative of communication denial occurs further includes, for example, an abnormality occurring in a network environment between the information processing apparatus and the external apparatus and, for example, an abnormality occurring in hardware of the external apparatus. On the other hand, unless the information processing apparatus waits until a next update timing of revocation information about digital certificates or unless the information processing apparatus receives an instruction for transmitting an acquisition request for revocation information about digital certificates, the information processing apparatus is not able to recognize that the digital certificate retained by the information processing apparatus has been revoked.

SUMMARY OF THE INVENTION

According to an aspect of the embodiments, an apparatus includes a memory device that stores a set of instructions, and at least one processor that executes the instructions to perform control to cause a storage unit to store a digital certificate issued by a certification authority, release a public key whose validity is certified by the digital certificate and perform encrypted communication with an external apparatus using the public key, and transmit, to the certification authority, an acquisition request for revocation information about digital certificates in a case where a predetermined condition is satisfied.

Further features of the aspect of the embodiments will become apparent from the following description of exemplary embodiments with reference to the attached drawings.

BRIEF DESCRIPTION OF THE DRAWINGS

FIGS. 6A, 6B, and 6C are schematic diagrams illustrating a table according to the first exemplary embodiment.

FIG. 7 illustrates a configuration of a screen according to the first exemplary embodiment.

FIGS. 11A and 11B illustrate a configuration of a screen according to the first exemplary embodiment.

FIG. 14 is a flowchart illustrating an example of a control operation according to the second exemplary embodiment.

DESCRIPTION OF THE EMBODIMENTS

Various exemplary embodiments, features, and aspects of the disclosure will be described in detail below with reference to the accompanying drawings. Furthermore, the following exemplary embodiments should not be construed to limit the disclosure set forth in the claims, and not all of the combinations of features described in the exemplary embodiments are applied for resolution means of the disclosure.

In a first exemplary embodiment, a request for acquiring revocation information about digital certificates issued by a certification authority from the certification authority is transmitted to the certification authority according to an error occurring in performing communication with an external apparatus using a digital certificate retained by an information processing apparatus.

The following is the detailed description of the first exemplary embodiment.

Figure 1:
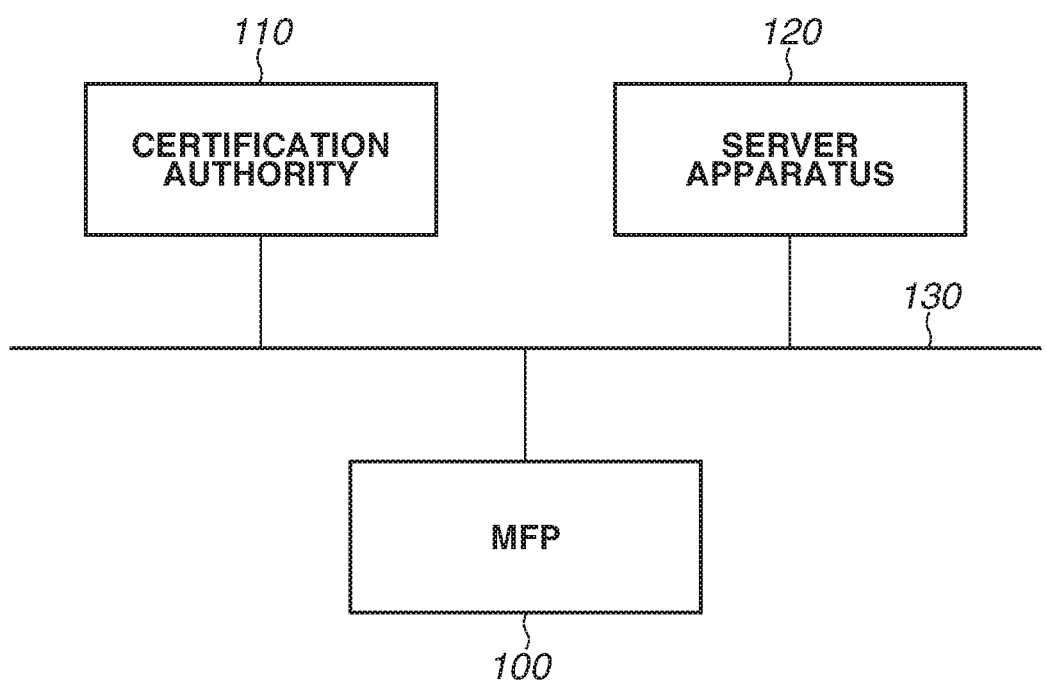
FIG. 1 is a block diagram illustrating a configuration of a network system according to an exemplary embodiment.

A configuration of the entirety of a network system according to the first exemplary embodiment is described with reference to the block diagram of FIG. 1. The network system includes a multifunction peripheral (MFP) 100, which is an example of an information processing apparatus, a certification authority (CA) 110, and a server apparatus 120, which is an example of an external apparatus.

The MFP 100, the certification authority 110, and the server apparatus 120 are interconnected via a network 130. Therefore, the MFP 100, the certification authority 110, and the server apparatus 120 are able to perform communication with one another and are thus able to transmit and receive data to and from one another. The network 130 can be a local area network (LAN) or a wide area network (WAN), such as the Internet. Furthermore, while a configuration in which a single server apparatus 120 is connected to the MFP 100 via the network 130 is illustrated as an example in FIG. 1, the aspect of the embodiments is not limited to this configuration. A configuration in which a plurality of server apparatuses 120 is connected to the MFP 100 via the network 130 can be employed.

The MFP 100 includes a scanner unit, which is an image input device, and a printer unit, which is an image output device. The scanner unit includes an automatic document feeding unit, which is configured to convey a document stacked on a document tray, and an image reading unit, which is configured to read an image of the document using an optical sensor, such as a charge-coupled device (CCD) sensor. The image reading unit reads an image of the document to generate image data and transfers the generated image data to a controller unit of the MFP 100. The controller unit is connected to the server apparatus 120 via the network 130, and performs processing, such as reception of a job from the server apparatus 120. The printer unit prints an image on a sheet based on image data input from the scanner unit or the server apparatus 120. Moreover, printing by the printer unit can be color printing or monochrome printing.

Furthermore, the MFP 100 has a copy function to generate image data by reading a document and print an image on a sheet based on the generated image data. Moreover, the MFP 100 has a personal computer (PC) print function to receive a print job from a PC and print characters or an image on a sheet based on data for which a printing instruction is received.

Furthermore, the MFP 100 has a function to generate a private key and a public key with a public key encryption system, which is used for authentication, encryption, electronic signature, or the like, and retain the generated private key and public key. Moreover, the MFP 100 has a function to generate an issuance request for requesting the certification authority 110, which is a certification organization for issuing digital certificates, to issue a digital certificate (hereinafter referred to as a "public key certificate") containing host identification information, which is used for identifying the MFP 100 on the network 130, and a public key. Furthermore, the host identification information, which is used for identifying the MFP 100 on the network 130, is, for example, an Internet Protocol (IP) address, a fully qualified domain name (FQDN), or the Domain Name System (DNS). Moreover, the MFP 100 has a function to transmit, to the certification authority 110, a notification for invalidating the issuance request for a digital certificate or a notification for revoking the issued digital certificate.

When communicating with the server apparatus 120, the MFP 100 transmits a client certificate retained by the MFP 100 to the server apparatus 120. Then, the server apparatus 120 acquires the client certificate from the MFP 100. Then, the server apparatus 120 inquires of the certification authority 110 about the client certificate acquired from the MFP 100 and determines whether the MFP 100 is justifiable as a communication partner. Then, in a case where it is determined that the MFP 100 is justifiable as a communication partner, secure communication is performed between the server apparatus 120 and the MFP 100.

In the first exemplary embodiment, a case is described in which the MFP 100 serves as a client and the server apparatus 120 serves as a server. The MFP 100 retains a public key certificate (client certificate) signed by the certification authority 110 and issued by the certification authority 110. Moreover, the server apparatus 120 retains a public key certificate (server certificate) signed by the certification authority 110 and issued by the certification authority 110. When communicating with the MFP 100, the server apparatus 120 transmits the server certificate retained by the server apparatus 120 to the MFP 100. Then, the MFP 100 acquires the server certificate from the server apparatus 120. Then, the MFP 100 inquires of the certification authority 110 about the server certificate acquired from the server apparatus 120 and determines whether the server apparatus 120 is justifiable as a communication partner. Then, in a case where it is determined that the server apparatus 120 is justifiable as a communication partner, secure communication is performed between the MFP 100 and the server apparatus 120.

Figure 2:
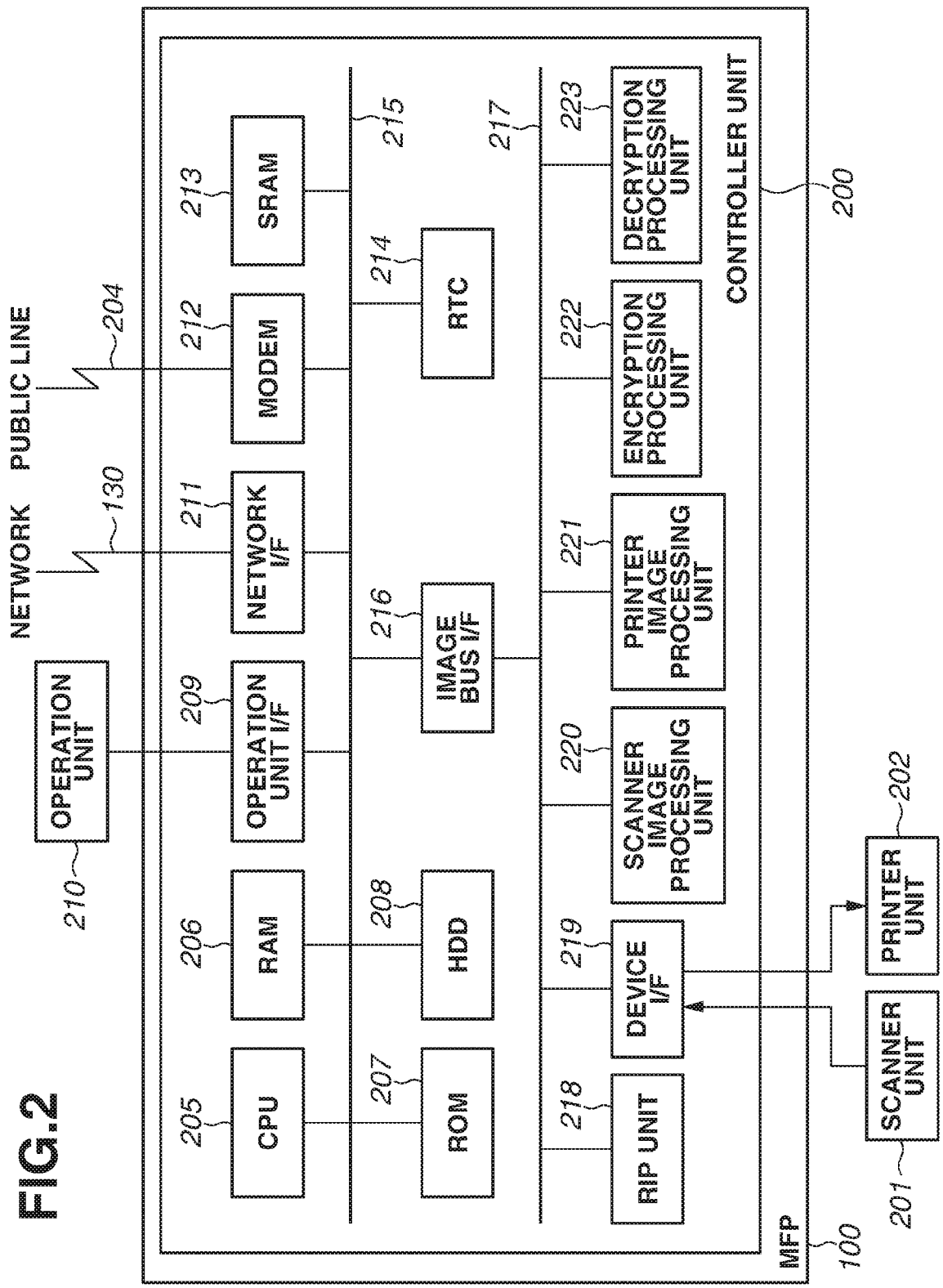
FIG. 2 is a block diagram illustrating a configuration of hardware of a multifunction peripheral (MFP) according to an exemplary embodiment.

Next, a hardware configuration of the MFP 100 according to the first exemplary embodiment is described with reference to the block diagram of FIG. 2.

A controller unit 200 includes a central processing unit (CPU) 205, a random access memory (RAM) 206, an operation unit interface (I/F) 209, a network interface I/F 211, a modulator-demodulator (modem) 212, a static RAM (SRAM) 213, a read-only memory (ROM) 207, a hard disk drive (HDD) 208, an image bus I/F 216, and a real-time clock (RTC) 214. These modules are interconnected via a system bus 215 or a hub and are able to transmit and receive data to and from one another.

The controller unit 200 further includes a raster image processor (RIP) unit 218, a device I/F 219, a scanner image processing unit 220, a printer image processing unit 221, an encryption processing unit 222, and a decryption processing unit 223. These modules are interconnected via an image bus 217 or a hub and are able to transmit and receive data to and from one another.

Furthermore, the controller unit 200 is connected to a scanner unit 201, which is an image input device, and a printer unit 202, which is an image output device, via the device I/F 219. Moreover, the controller unit 200 is connected to the network 130 via the network interface I/F 211, and performs inputting and outputting of image information and device information. Additionally, the controller unit 200 is connected to a public line 204 via the modem 212, and performs inputting and outputting of image information and device information. Furthermore, the controller unit 200 is connected to an operation unit 210 via the operation unit I/F 209, and performs reception of inputting from the user and display of a screen on the operation unit 210.

The CPU 205 comprehensively controls the MFP 100 based on, for example, a control program stored in the ROM 207 or the HDD 208. The CPU 205 reads out the control program stored in the ROM 207 or the HDD 208, loads the control program onto the RAM 206, and performs various control processing operations. For example, the CPU 205 performs various control processing operations, such as control over reading by the scanner unit 201, control over printing by the printer unit 202, and control over update of firmware.

The HDD 208 primarily stores information (system software) for activating and operating a computer and image data. Moreover, the HDD 208 stores various control programs for performing various processing operations in the flowcharts illustrated in FIGS. 3, 4, 8, 9, 12, 14, and 15 performed by the CPU 205, which are described below. Additionally, the HDD 208 stores, for example, a display control program for displaying various screens on a display panel of the operation unit 210 and a program for performing rasterization. The CPU 205 reads out programs stored in the HDD 208 and loads the programs onto the RAM 206, thus performing various operations according to the present exemplary embodiment.

The HDD 208 stores public key certificates signed by the certification authority 110 and issued by the certification authority 110. Moreover, the HDD 208 stores a management table for public key certificates, which is described below with reference to FIGS. 6A, 6B, and 6C. The management table contains various pieces of stored information about public key certificates issued by the certification authority 110 (for example, name, usage, revocation flag, issuer, expiration date, and serial number). The term "usage" refers to which communication protocol is used to communicate with the server apparatus 120 using a public key certificate issued by the certification authority 110. The typical communication protocol used to perform communication processing includes, for example, Secure Sockets Layer (SSL) and IEEE 802.1X communication.

The RAM 206 is a readable and writable memory. Moreover, the RAM 206 is also a system work memory used for the CPU 205 to operate. Additionally, the RAM 206 is also used as a temporary storage region for image data input from, for example, the scanner unit 201 or the server apparatus 120.

The ROM 207 is a read-only memory. The ROM 207 serves also as a boot ROM. The ROM 207 previously stores a boot program for the system. Moreover, the ROM 207 previously stores management data specific to the MFP 100. Furthermore, various control programs for performing various processing operations in the flowcharts illustrated in FIGS. 3, 4, 8, 9, 12, 14, and 15 performed by the CPU 205, which are described below, can be stored in not the HDD 208 but the ROM 207. Moreover, for example, a display control program for displaying various screens on a display panel of the operation unit 210 and a program for performing rasterization can be stored in not the HDD 208 but the ROM 207. In this case, the CPU 205 reads out programs stored in the ROM 207 and loads the programs onto the RAM 206, thus performing various operations according to the present exemplary embodiment.

The operation unit 210 includes a display panel (touch panel) having a touch panel function and hardware keys. A user interface (UI) screen generated by the CPU 205 is read out of the RAM 206 and is then displayed on the display panel. The user is allowed to perform various settings and input operations using, for example, the touch panel or the hardware keys. Then, the CPU 205 receives various settings and input operations performed by the user via, for example, the touch panel or the hardware keys. The touch panel notifies the CPU 205 of coordinate information indicating the touched position.

The operation unit I/F 209 is an interface used to connect the operation unit 210 and the controller unit 200. The operation unit I/F 209 outputs image data to be displayed on the display panel to the operation unit 210. Moreover, the operation unit I/F 209 transfers information input by the user via the operation unit 210 to the CPU 205.

The network I/F 211 connects to the network 130 to perform outputting and inputting of information. The modem 212 connects to the public line 204 to perform outputting and inputting of information. The SRAM 213 is a non-volatile recording medium that is capable of operating at high speed. The RTC 214, which is a clock that keeps track of the current time, performs processing that continues counting the current time even when the controller unit 200 is in a power-off state. The image bus I/F 216 is a bus bridge that connects the system bus 215 and the image bus 217, which is used to transfer image data at high speed, and converts a data structure. The image bus 217 is composed of a Peripheral Component Interconnect (PCI) bus or an IEEE 1394 bus. The RIP unit 218 rasterizes page-description language (PDL) data transmitted via the network 130 to generate bitmap data (an image file).

The device I/F 219 connects the scanner unit 201 or the printer unit 202 and the controller unit 200, and performs conversion of image data between synchronous data and asynchronous data. The scanner image processing unit 220 performs correction, processing, and editing on input image data. The printer image processing unit 221 performs, on an image file generated by the RIP unit 218, resolution conversion processing or correction processing adapted for a printer engine of the printer unit 202. Furthermore, data including a bitmap image or a print processing command is transmitted and received between the device I/F 219 and the printer engine. Then, the printer engine performs print processing based on the transmitted data. The encryption processing unit 222 performs encryption processing of input data including image data. The decryption processing unit 223 performs decryption processing of encrypted data.

In the first exemplary embodiment, a request for acquiring, from a certification authority, revocation information about digital certificates issued by the certification authority is transmitted to the certification authority according to an error occurring in performing communication with an external apparatus using a digital certificate retained by an information processing apparatus. For example, the MFP 100 attempts to perform secure communication with the server apparatus 120 using a public key certificate stored in the HDD 208, and receives an error notification indicative of communication denial from the server apparatus 120. Then, the MFP 100 transmits, to the certification authority 110, a request for acquiring revocation information about public key certificates issued by the certification authority 110, according to receiving the error notification indicative of communication denial from the server apparatus 120.

This enables the information processing apparatus to recognize that a digital certificate retained by the information processing apparatus has been revoked, without waiting until a next update timing of revocation information about digital certificates or without receiving an instruction for transmitting an acquisition request for revocation information about digital certificates to the certification authority. Furthermore, the administrator of the information processing apparatus is enabled to confirm that the cause of occurrence of an error in performing communication with an external apparatus using a digital certificate retained by the information processing apparatus is revocation of the digital certificate retained by the information processing apparatus.

In the MFP 100 according to the first exemplary embodiment, a series of processing steps performed until a public key certificate retained by the MFP 100 is automatically updated according to occurrence of an error indicative of communication denial is described with reference to the flowchart of FIG. 3. This processing is performed by the CPU 205 executing a control program read from the ROM 207 or the HDD 208 and then loaded on the RAM 206.

First, in step S301, the CPU 205 performs communication processing using a public key certificate retained by the MFP 100. At this time, communication processing is performed with the MFP 100 serving as a client and the server apparatus 120 serving as a server. The typical communication protocol used to perform communication processing includes, for example, SSL and IEEE 802.1X communication. While, in the first exemplary embodiment, an example is described in which IEEE 802.1X communication is used as the communication protocol, another communication protocol can be used.

In step S302, the CPU 205 determines whether an error indicative of communication denial has occurred. If the CPU 205 determines that an error indicative of communication denial has not occurred (NO in step S302), the communication processing ends normally, so that a series of processing steps illustrated in FIG. 3 ends. On the other hand, if the CPU 205 determines that an error indicative of communication denial has occurred (YES in step S302), the processing proceeds to step S400.

In a case where the communication protocol is IEEE 802.1X, when authentication is failed, a packet with the value of type of EAPpacket=failure is transmitted from the server (server apparatus 120) to the client (MFP 100). Moreover, EAP means Extensible Authentication Protocol.

with this, the CPU 205 determines that authentication is failed. The cause of authentication being failed is not clear from the value of type of EAPpacket=failure. With regard to that cause, in addition to revocation of a public key certificate of the client that is based on the leakage of a private key to the outside of the MFP 100, revocation of a public key certificate of the client that is based on the passage of the expiration date of the public key certificate also causes the value of type of EAPpacket=failure to occur. Moreover, even in a case where the type of a public key certificate of the client is an unsupported type, the value of type of EAPpacket=failure occurs. Thus, the CPU 205 is unable to determine whether the cause of authentication being failed is revocation of a public key certificate of the client (MFP 100).

Therefore, the CPU 205 acquires revocation information about public key certificates from the certification authority 110 via the network 130 using Simple Certificate Enrollment Protocol (SCEP). SCEP is a protocol defined in an Internet Draft. The main function of SCEP includes acquisition of a certification authority certificate, acquisition of revocation information about public key certificates, and automatic updating of public key certificates. Moreover, besides SCEP, there are many protocols that implement similar functions. While, in the first exemplary embodiment, an example is described in which SCEP is used, a protocol having a similar function other than SCEP can be used. Furthermore, in a second exemplary embodiment, an example in which Online Certificate Status Protocol (OCSP) is used is described below.

In step S400, the CPU 205 performs revocation confirmation processing for a public key certificate using SCEP. Furthermore, details of the processing in step S400 are described below with reference to FIG. 4, which is composed of FIGS. 4A and 4B. Then, after the processing in step S400, the processing proceeds to step S303.

In step S303, the CPU 205 determines whether the public key certificate has been revoked. Cases where the CPU 205 determines that the result of determination in step S303 is NO include the following. For example, the case is where a cryptographic algorithm or encryption strength for use in cryptographic communication between the MFP 100 and server apparatus 120 does not satisfy a condition set in the server apparatus 120. Moreover, for example, the case is where an abnormality occurs in a network environment between the MFP 100 and server apparatus 120. Furthermore, for example, the case is where an abnormality occurs in hardware of the server apparatus 120. Additionally, for example, the case is where the load on the server apparatus 120 increases, thus disabling sending a response.

If the CPU 205 determines that the public key certificate has not been revoked (NO in step S303), the processing proceeds to step S305. In step S305, the CPU 205 displays, on the display panel of the operation unit 210, an error screen for notifying the user that an error indicative of communication denial has occurred from a cause other than revocation of the public key certificate. At this time, since the public key certificate has not been revoked, when the cause of an error indicative of communication denial (a cause other than revocation of the public key certificate) is resolved, the MFP 100 becomes able to perform secure communication with the server apparatus 120 using the present public key certificate. After the processing in step S305, a series of processing steps illustrated in FIG. 3 ends.

On the other hand, if the CPU 205 determines that the public key certificate has been revoked (YES in step S303), the processing proceeds to step S800. Furthermore, the CPU 205 can display, on the display panel of the operation unit 210, a warning screen for notifying the user that the public key certificate used in performing communication with the server apparatus 120 has been revoked, according to determining that the public key certificate has been revoked (YES). Then, after the CPU 205 displays such a warning screen on the display panel of the operation unit 210, the processing can proceed to step S800. This enables the user to know that the cause of an error occurring in performing communication with the server apparatus 120 using the public key certificate retained by the MFP 100 is revocation of the public key certificate.

In step S800, the CPU 205 performs acquisition processing for a public key certificate. Moreover, details of the processing in step S800 are described below with reference to FIG. 8. Then, after the processing in step S800, the processing proceeds to step S304.

In step S304, the CPU 205 determines whether acquisition of a public key certificate is successful. If the CPU 205 determines that acquisition of a public key certificate is successful (YES in step S304), the processing proceeds to step S900. In step S900, the CPU 205 performs processing for replacing the public key certificate retained by the MFP 100. Moreover, details of the processing in step S900 are described below with reference to FIG. 9. Then, after the processing in step S900, a series of processing steps illustrated in FIG. 3 ends. On the other hand, if the CPU 205 determines that acquisition of a public key certificate is failed (NO in step S304), a series of processing steps illustrated in FIG. 3 ends.

Next, a series of processing steps performed until revocation confirmation of the public key certificate is performed with use of SCEP is described with reference to the flowchart of FIG. 4. This processing is performed by the CPU 205 executing a control program read from the ROM 207 or the HDD 208 and then loaded on the RAM 206.

Figure 5:
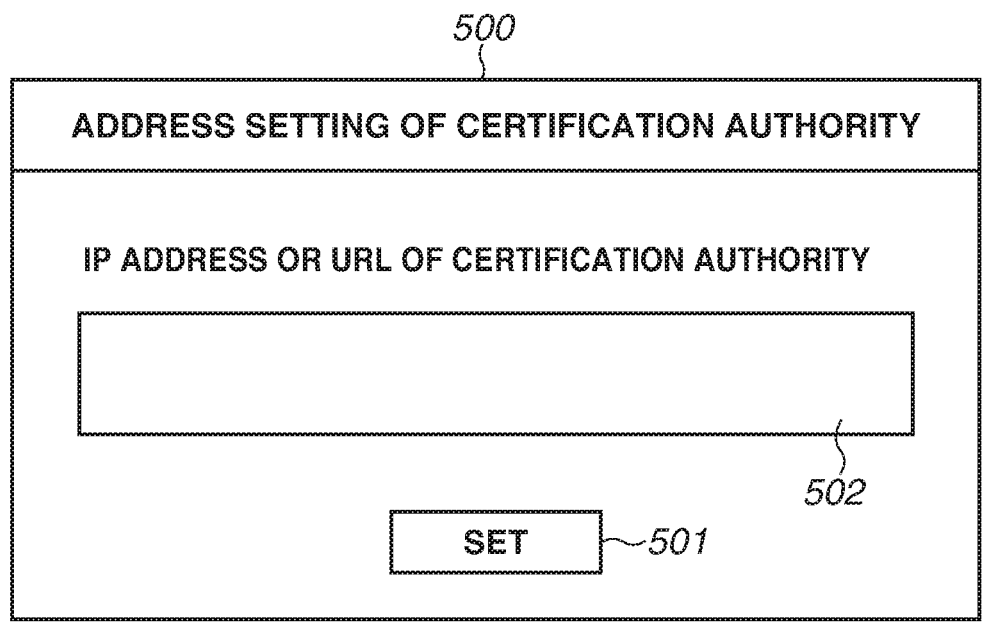
FIG. 5 illustrates a configuration of a screen according to the first exemplary embodiment.

First, the CPU 205 is used to acquire revocation information about public key certificates from the certification authority 110. Then, the administrator of the MFP 100 calls up a setting screen 500 illustrated in FIG. 5 via the operation unit 210 so as to set an IP address of the certification authority 110.

The administrator of the MFP 100 enters the IP address or Uniform Resource Locator (URL) of the certification authority 110 into a field 502 via the setting screen 500 displayed on the display panel of the operation unit 210. Then, after entering the IP address or Uniform Resource Locator (URL) of the certification authority 110 into the field 502, the administrator of the MFP 100 touches a setting button 501. This completes setting of the address of the certification authority 110 and causes the setting value of the set address of the certification authority 110 to be stored into the HDD 208.

Next, a management table 600 for managing information about public key certificates that are retained by the MFP 100 is described with reference to the schematic diagrams of FIGS. 6A, 6B, and 6C. The examples illustrated in FIGS. 6A, 6B, and 6C indicate that the MFP 100 retains a public key certificate 601, a public key certificate 602, a public key certificate 603, and a public key certificate 604. The management table 600 is used to manage information about public key certificates (name 605, usage 606, revocation flag 607, issuer 608, expiration date 609, and serial number 610) in association with each of the public key certificates that are retained by the MFP 100. The initial value of the revocation flag 607 is "FALSE", and, according to revocation of a public key certificate being confirmed by the CPU 205, the value of the revocation flag of the public key certificate is changed from "FALSE" to "TRUE". Such information about public key certificates managed with the management table 600 is stored in the HDD 208.

Details of the processing in step S400 are described as follows. In step S401, the CPU 205 generates a request for acquiring revocation information about public key certificates (hereinafter referred to as a "revocation information request") from the certification authority 110. Furthermore, the revocation information request that is generated in step S401 is a request used to inquire about a list of serial numbers of public key certificates that have been revoked from among public key certificates signed by the certification authority 110 and issued by the certification authority 110.

In step S402, the CPU 205 transmits the revocation information request generated in step S401 to the certification authority 110 via the network 130.

In step S403, the CPU 205 determines whether a response has been received from the certification authority 110 within a predetermined time. The predetermined time as used herein is the maximum value of a time consumable to acquire the revocation information about public key certificates (a time determined by the specification of device setting of the MFP 100). If the CPU 205 determines that no response has been received from the certification authority 110 within the predetermined time (NO in step S403), then in step S417, the CPU 205 records, as a log, the cause by which no response has been received within the predetermined time. Moreover, such a log is stored into the HDD 208 or the RAM 206. Then, after the processing in step S417, a series of processing steps illustrated in FIG. 4 ends, and the processing proceeds to step S303 in FIG. 3. On the other hand, if the CPU 205 determines that a response has been received from the certification authority 110 within the predetermined time (YES in step S403), the processing proceeds to step S404.

In step S404, the CPU 205 determines whether acquisition of the revocation information about public key certificates is successful. If the CPU 205 determines that acquisition of the revocation information about public key certificates is failed (NO in step S404), then in step S418, the CPU 205 records, as a log, the cause by which acquisition of the revocation information about public key certificates is failed. Moreover, such a log is stored into the HDD 208 or the RAM 206. Then, after the processing in step S418, a series of processing steps illustrated in FIG. 4 ends, and the processing proceeds to step S303 in FIG. 3.

On the other hand, if the CPU 205 determines that acquisition of the revocation information about public key certificates is successful (YES in step S404), then in step S405, the CPU 205 acquires the setting value of a public key certificate targeted for revocation confirmation from the HDD 208. Here, the setting value of a public key certificate targeted for revocation confirmation is described with reference to a setting screen 700 illustrated in FIG. 7. Moreover, the setting screen 700 is called up via the operation unit 210 and is then displayed on the display panel of the operation unit 210. The administrator of the MFP 100 selects, via the setting screen 700, one of setting of "all the public key certificates that are retained by the MFP 100" and setting of "a public key certificate that is used during communication" as the public key certificate targeted for revocation confirmation. Then, the setting value of a public key certificate targeted for revocation confirmation, which has been set via the setting screen 700, is stored into the HDD 208.

In a case where a private key which is one key of a key pair of a public key certificate retained by the MFP 100 has been leaked to the outside of the MFP 100, another private key retained by the MFP 100 may also have been leaked similarly. Then, not only the public key certificate that is used during communication but also all the public key certificates that are retained by the MFP 100 may have been revoked by the certification authority 110. Therefore, in a case where the setting of "all the public key certificates that are retained by the MFP 100" is selected as the public key certificate targeted for revocation confirmation, each of a plurality of public key certificates that are retained by the MFP 100 is targeted for revocation confirmation.

Then, in step S406, the CPU 205 determines whether the target for revocation confirmation is "a public key certificate that is used during communication". If the CPU 205 determines that the target for revocation confirmation is "a public key certificate that is used during communication" (YES in step S406), the processing proceeds to step S407.

In step S407, the CPU 205 performs revocation confirmation of a public key certificate used at the time of occurrence of an error indicative of communication denial based on the revocation information about public key certificates acquired in step S404. Moreover, the revocation information about public key certificates contains the serial number 610 of a public key certificate that has been revoked from among the public key certificates issued by the certification authority 110. In step S407, the CPU 205 performs revocation confirmation of the public key certificate by performing matching between the serial number 610 of the public key certificate used at the time of occurrence of an error indicative of communication denial and the serial number 610 contained in the revocation information about public key certificates acquired in step S404.

Then, in step S408, the CPU 205 determines whether the public key certificate used at the time of occurrence of an error indicative of communication denial has been revoked. More specifically, when the serial number 610 of the public key certificate used at the time of occurrence of an error indicative of communication denial coincides with the serial number 610 acquired in step S404, the CPU 205 determines that the public key certificate used at the time of occurrence of an error indicative of communication denial has been revoked. If the CPU 205 determines that the public key certificate used at the time of occurrence of an error indicative of communication denial has been revoked (YES in step S408), then in step S409, the CPU 205 sets the value of the revocation flag 607 corresponding to the public key certificate used at the time of occurrence of the error to "TRUE" in the management table 600.

Figure 3:
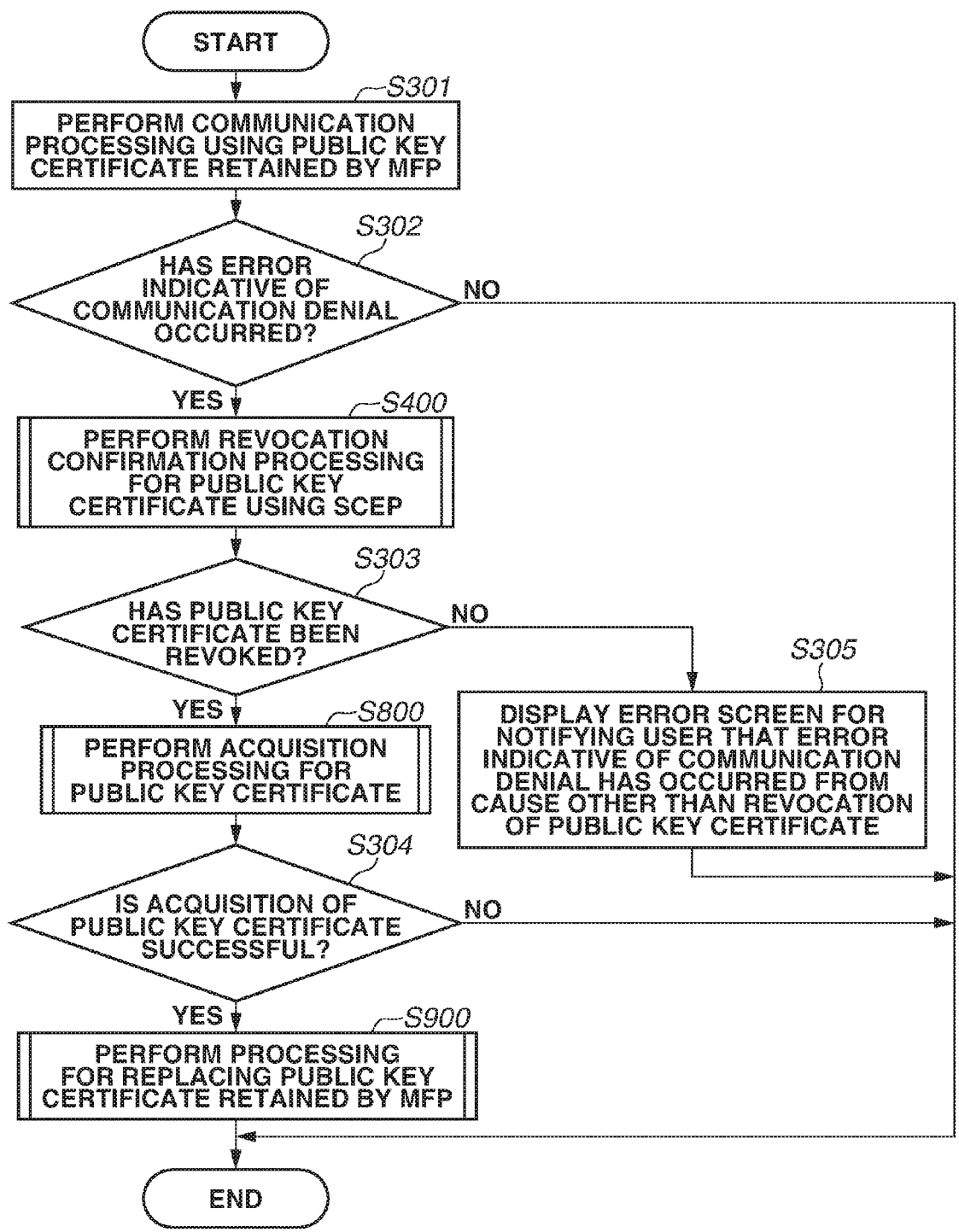
FIG. 3 is a flowchart illustrating an example of a control operation according to a first exemplary embodiment.
Figure 4B:
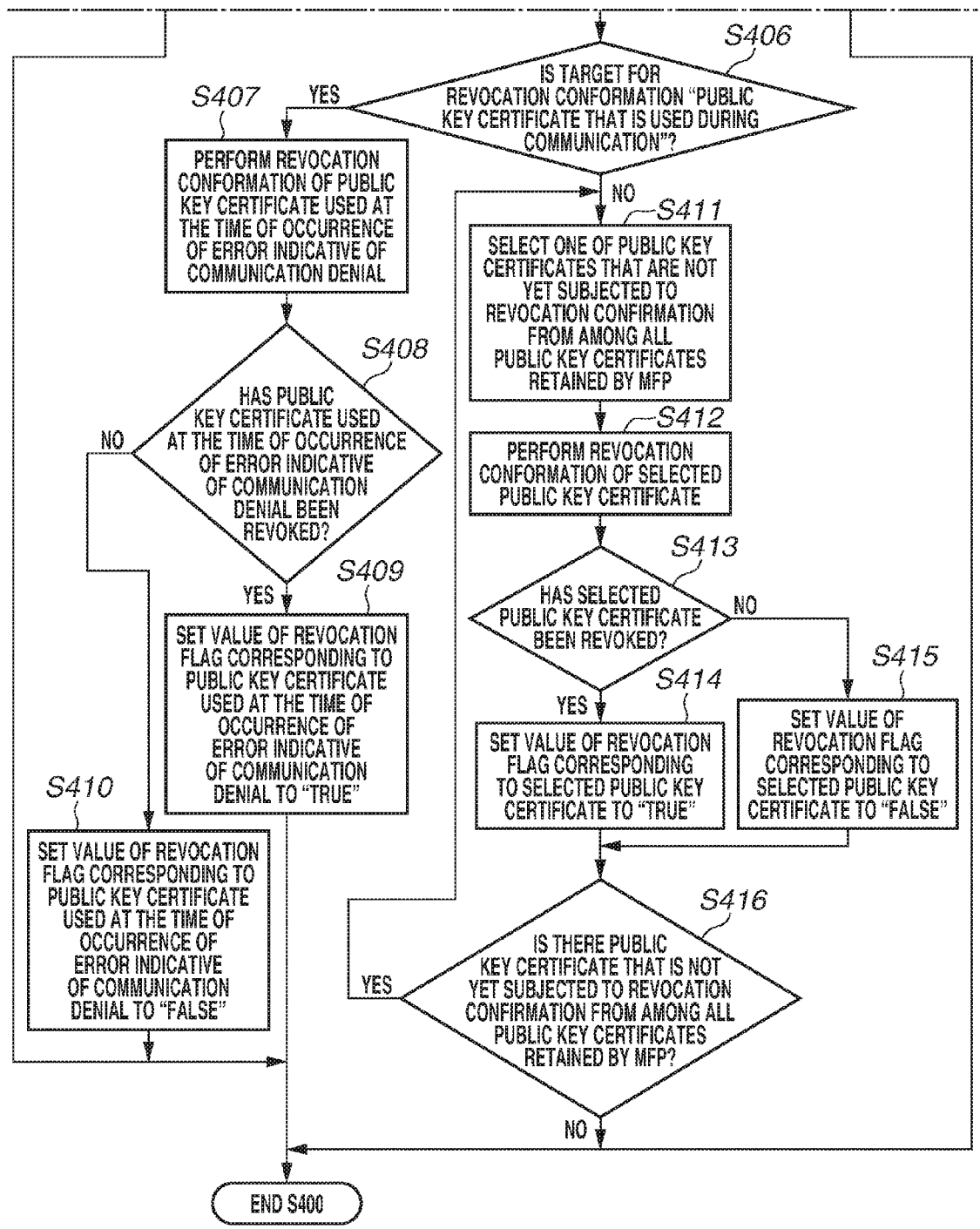
FIG. 4, which is composed of FIGS. 4A and 4B, is a flowchart illustrating an example of a control operation according to the first exemplary embodiment.

Then, after the processing in step S409, a series of processing steps illustrated in FIG. 4 ends, and the processing proceeds to step S303 in FIG. 3. On the other hand, if the CPU 205 determines that the public key certificate used at the time of occurrence of an error indicative of communication denial has not been revoked (NO in step S408), then in step S410, the CPU 205 sets the value of the revocation flag 607 corresponding to the public key certificate used at the time of occurrence of the error to "FALSE" in the management table 600. Then, after the processing in step S410, a series of processing steps illustrated in FIG. 4 ends, and the processing proceeds to step S303 in FIG. 3.

On the other hand, in step S406, if the target for revocation confirmation is "all the public key certificates that are retained by the MFP 100", the CPU 205 determines that the result is NO, and then, the processing proceeds to step S411.

In step S411, the CPU 205 selects one of public key certificates that are not yet subjected to revocation confirmation from among all the public key certificates that are retained by the MFP 100. Then, in step S412, the CPU 205 performs revocation confirmation of the public key certificate selected in step S411 based on the revocation information about public key certificates acquired in step S404. In step S412, the CPU 205 performs revocation confirmation of the public key certificate by performing matching between the serial number 610 of the public key certificate selected in step S411 and the serial number 610 contained in the revocation information about public key certificates acquired in step S404.

Then, in step S413, the CPU 205 determines whether the public key certificate selected in step S411 has been revoked. More specifically, when the serial number 610 of the public key certificate selected in step S411 coincides with the serial number 610 acquired in step S404, the CPU 205 determines that the public key certificate selected in step S411 has been revoked. If the CPU 205 determines that the public key certificate selected in step S411 has been revoked (YES in step S413), then in step S414, the CPU 205 sets the value of the revocation flag 607 corresponding to the public key certificate selected in step S411 to "TRUE" in the management table 600. Then, after the processing in step S414, the processing proceeds to step S416. On the other hand, if the CPU 205 determines that the public key certificate selected in step S411 has not been revoked (NO in step S413), then in step S415, the CPU 205 sets the value of the revocation flag 607 corresponding to the public key certificate selected in step S411 to "FALSE" in the management table 600. Then, after the processing in step S415, the processing proceeds to step S416.

In step S416, the CPU 205 determines whether there is a public key certificate that is not yet subjected to revocation confirmation from among all the public key certificates that are retained by the MFP 100. If the CPU 205 determines that there is a public key certificate that is not yet subjected to revocation confirmation (YES in step S416), the processing returns to step S411. On the other hand, if revocation confirmation of all the public key certificates that are retained by the MFP 100 has been performed, in step S416, the CPU 205 determines that the result is NO, and then, a series of processing steps illustrated in FIG. 4 ends, so that the processing proceeds to step S303 in FIG. 3.

Next, a series of processing steps performed until acquisition processing for a public key certificate is performed in the MFP 100 according to the first exemplary embodiment is described with reference to the flowchart of FIG. 8. This processing is performed by the CPU 205 executing a control program read from the ROM 207 or the HDD 208 and then loaded on the RAM 206.

In step S801, the CPU 205 selects one of public key certificates that are not yet subjected to processing for acquiring a public key certificate from among public key certificates in a revoked state (in other words, public key certificates the value of the revocation flag 607 of which is "TRUE") that are retained by the MFP 100.

In step S802, the CPU 205 generates a key pair (a private key and a public key) for the public key certificate selected in step S801. Moreover, the key pair generated in step S802 is stored into the HDD 208.

Then, in step S803, the CPU 205 generates a public key certificate signature request based on a public key certificate of the key pair generated in step S802. Moreover, the public key certificate signature request generated in step S803 is stored into the HDD 208.

Then, in step S804, the CPU 205 transmits the public key certificate signature request generated in step S803 to the certification authority 110 via the network 130.

Then, in step S805, the CPU 205 determines whether a response has been received from the certification authority 110 within a predetermined time. The predetermined time as used herein is the maximum value of a time consumable to acquire a new public key certificate (a time determined by the specification of device setting of the MFP 100). If the CPU 205 determines that a response has been received from the certification authority 110 within the predetermined time (YES in step S805), the processing proceeds to step S806. On the other hand, if the CPU 205 determines that no response has been received from the certification authority 110 within the predetermined time (NO in step S805), the processing proceeds to step S810.

In step S806, the CPU 205 determines whether acquisition of a public key certificate is successful. If the CPU 205 determines that acquisition of a public key certificate is failed (NO in step S806), the processing proceeds to step S809. On the other hand, if the CPU 205 determines that acquisition of a public key certificate is successful (YES in step S806), the processing proceeds to step S807.

In step S807, the CPU 205 registers the public key certificate, the acquisition of which is successful in step S806, with the MFP 100. At this time, the public key certificate, the acquisition of which is successful in step S806, is paired with the key pair generated in step S802, and is stored into the HDD 208 together with the key pair generated in step S802. Then, in step S808, the CPU 205 determines whether there is a public key certificate that is not yet subjected to processing for acquiring a public key certificate from among the public key certificates in a revoked state (in other words, public key certificates the value of the revocation flag 607 of which is "TRUE") that are retained by the MFP 100.

If the CPU 205 determines that there is a public key certificate that is not yet subjected to processing for acquiring a public key certificate from among the public key certificates in a revoked state that are retained by the MFP 100 (YES in step S808), the processing returns to step S801. On the other hand, if processing for acquiring a public key certificate has been performed on all of the public key certificates in a revoked state that are retained by the MFP 100, the CPU 205 determines that the result is NO in step S808. Then, a series of processing steps illustrated in FIG. 8 ends, and the processing proceeds to step S304 in FIG. 3.

In step S809, the CPU 205 determines the reason for which acquisition of a public key certificate is failed. If the CPU 205 determines that the reason for which acquisition of a public key certificate is failed is "PENDING" (PENDING in step S809), the processing proceeds to step S810. On the other hand, if the CPU 205 determines that the reason for which acquisition of a public key certificate is failed is "FAILURE" (FAILURE in step S809), the processing proceeds to step S811.

In step S810, the CPU 205 determines whether the number of times of retry performed for acquiring a public key certificate has reached the maximum number of times. Moreover, the maximum number of times can be previously determined in default configuration as a design specification of the MFP 100, or can be optionally set by the administrator of the MFP 100.

If the CPU 205 determines that the number of times of retry performed for acquiring a public key certificate has reached the maximum number of times (YES in step S810), then in step S811, the CPU 205 records, as a log, the cause by which acquisition of a public key certificate is failed. Moreover, the log is stored into the HDD 208 or the RAM 206. Then, after the processing in step S811, a series of processing steps illustrated in FIG. 8 ends, and the processing proceeds to step S304 in FIG. 3. On the other hand, if the CPU 205 determines that the number of times of retry performed for acquiring a public key certificate has not reached the maximum number of times (NO in step S810), then in step S812, the CPU 205 waits until a given period of time elapses. Moreover, the given period of time can be previously determined in default configuration as a design specification of the MFP 100, or can be optionally set by the administrator of the MFP 100. If the CPU 205 determines that the given period of time has elapsed (YES in step S812), the processing returns to step S804. On the other hand, the CPU 205 repeats the processing in step S812 until the given period of time elapses.

Figure 9:
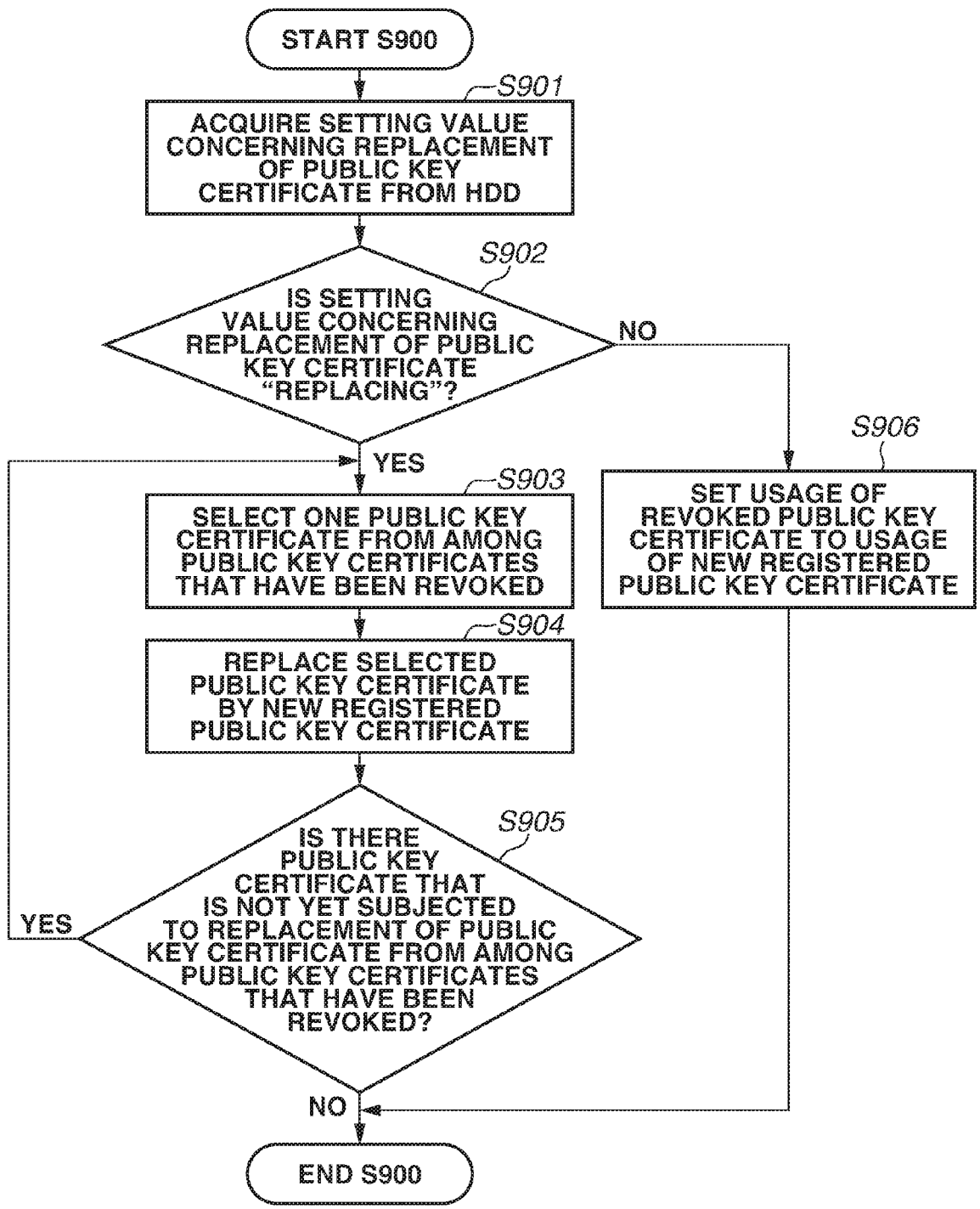
FIG. 9 is a flowchart illustrating an example of a control operation according to the first exemplary embodiment.

Next, a series of processing steps performed until the public key certificate that is retained by the MFP 100 is replaced in the MFP 100 according to the first exemplary embodiment is described with reference to the flowchart of FIG. 9. This processing is performed by the CPU 205 executing a control program read from the ROM 207 or the HDD 208 and then loaded on the RAM 206.

Figure 10:
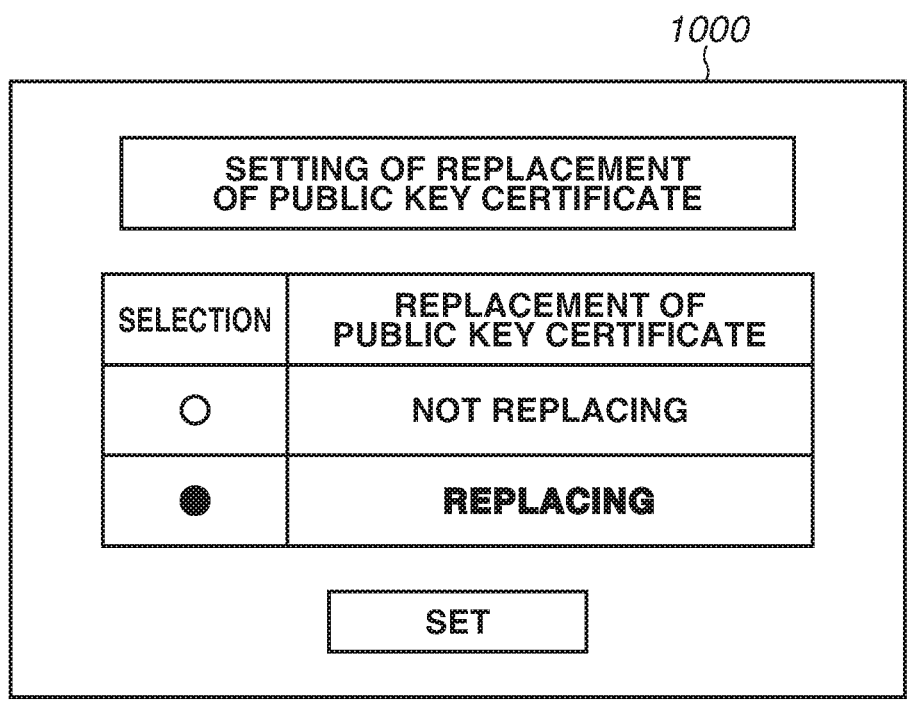
FIG. 10 illustrates a configuration of a screen according to the first exemplary embodiment.

First, in step S901, the CPU 205 acquires a setting value concerning replacement of a public key certificate from the HDD 208. The administrator of the MFP 100 calls up a setting screen 1000 illustrated in FIG. 10 via the operation unit 210 to set the setting value concerning replacement of a public key certificate. Then, the administrator of the MFP 100 selects one of "replacing" or "not replacing" a public key certificate via the setting screen 1000 displayed on the display panel of the operation unit 210. The setting value concerning replacement of a public key certificate (setting of "replacing" or "not replacing" a public key certificate), which is set here, is stored into the HDD 208.

Furthermore, "replacing" a public key certificate refers to deleting a public key certificate that is in a revoked state and setting the usage set in the public key certificate that is in a revoked state to the usage of a public key certificate registered in step S807 (in other words, a new public key certificate issued by the certification authority 110). On the other hand, "not replacing" a public key certificate refers to, without deleting a public key certificate that is in a revoked state, setting the usage set in the public key certificate that is in a revoked state to the usage of a public key certificate registered in step S807 (in other words, a new public key certificate issued by the certification authority 110).

In a case where setting of "replacing" a public key certificate is performed, the public key certificate that is in a revoked state is deleted from the HDD 208. At this time, as described below with reference to FIG. 11A, the public key certificate that is in a revoked state is not displayed in a list screen 1100 for public key certificates registered with the MFP 100. Therefore, the administrator of the MFP 100 is able to confirm only public key certificates that are in a valid state while viewing the list screen 1100 displayed on the display panel of the operation unit 210.

On the other hand, in a case where setting of "not replacing" a public key certificate is performed, the public key certificate that is in a revoked state is not deleted from the HDD 208. At this time, as described below with reference to FIG. 11B, the public key certificate that is in a revoked state is also displayed in a list screen 1100 for public key certificates registered with the MFP 100. Therefore, the administrator of the MFP 100 is able to confirm that there is a public key certificate that is in a revoked state while viewing the list screen 1100 displayed on the display panel of the operation unit 210.

If the CPU 205 determines that the setting value concerning replacement of a public key certificate is "replacing" (YES in step S902), the processing proceeds to step S903.

In step S903, the CPU 205 selects one public key certificate from among public key certificates that have been revoked (in other words, public key certificates the value of the revocation flag 607 is "TRUE"). Then, in step S904, the CPU 205 replaces the public key certificate selected in step S903 by the new public key certificate registered with the MFP 100 in step S807 illustrated in FIG. 8. At this time, the public key certificate that has been revoked and a key pair paired with that public key certificate are replaced.

Then, in step S905, the CPU 205 determines whether there is a public key certificate that is not yet subjected to replacement of a public key certificate from among the public key certificates that have been revoked (in other words, the public key certificates the value of the revocation flag 607 is "TRUE").

If the CPU 205 determines that there is a public key certificate that is not yet subjected to replacement of a public key certificate (YES in step S905), the processing returns to step S903. On the other hand, if the CPU 205 determines that there is no public key certificate that is not yet subjected to replacement of a public key certificate (NO in step S905), a series of processing steps illustrated in FIG. 9 ends, and a series of processing steps illustrated in FIG. 3 also ends.

On the other hand, if, in step S902, the CPU 205 determines that the setting value concerning replacement of a public key certificate is "not replacing" (NO in step S902), the processing proceeds to step S906.

Figure 8:
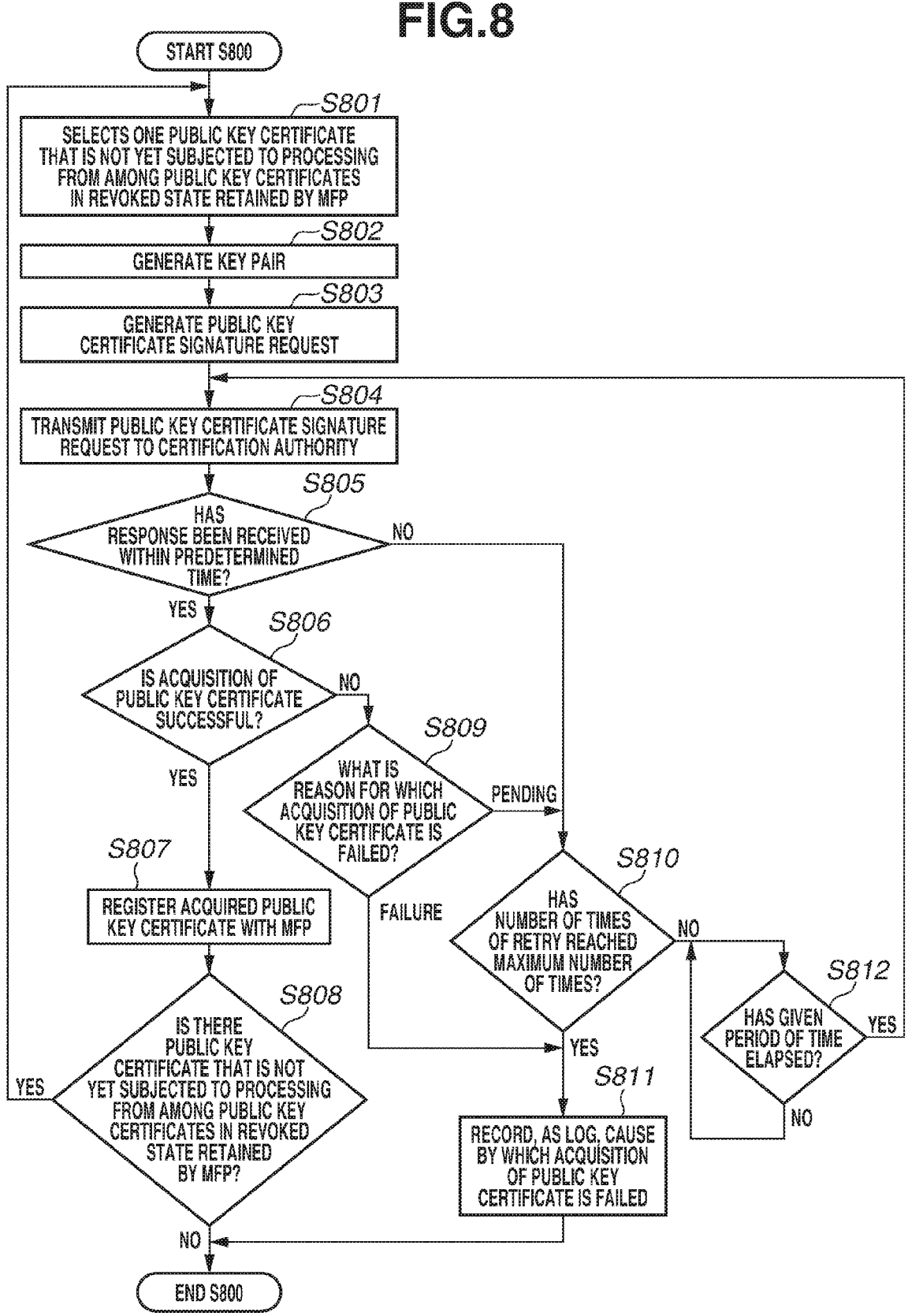
FIG. 8 is a flowchart illustrating an example of a control operation according to the first exemplary embodiment.

In step S906, the CPU 205 sets the usage of the public key certificate that has been revoked (in other words, the public key certificate the value of the revocation flag 607 is "TRUE") to the usage of the new public key certificate registered with the MFP 100 in step S807 illustrated in FIG. 8. After the processing in step S906, a series of processing steps illustrated in FIG. 9 ends, and a series of processing steps illustrated in FIG. 3 also ends.

Examples of processing for replacing a public key certificate are described with reference to the schematic diagrams of FIGS. 6A, 6B, and 6C. As illustrated in FIG. 6A, when having confirmed the revocation of the public key certificate 601, the CPU 205 sets the value of the revocation flag 607 of the public key certificate 601 to "TRUE". Then, the CPU 205 replaces the public key certificate 601, which has been revoked, by the new public key certificate 604 registered with the MFP 100 in step S807 illustrated in FIG. 8. In this case, as illustrated in FIG. 6B, the CPU 205 deletes the public key certificate 601 and a key pair paired with the public key certificate 601. Then, the CPU 205 associates the public key certificate 604 and a key pair paired with the public key certificate 604 with a number (No. 1) in the management table 600.

On the other hand, in the case of not replacing the public key certificate 601, which has been revoked, by the new public key certificate 604 registered with the MFP 100 in step S807 illustrated in FIG. 8, the CPU 205 does not delete the public key certificate 601, as illustrated in FIG. 6C. Instead, the CPU 205 associates the public key certificate 604 with a number (No. 4) in the management table 600. Then, the CPU 205 sets the usage 606 of the public key certificate 601 to the usage 606 of the public key certificate 604. In the example illustrated in FIG. 6C, "SSL" is set as the usage 606 of the public key certificate 604.

Figure 12:
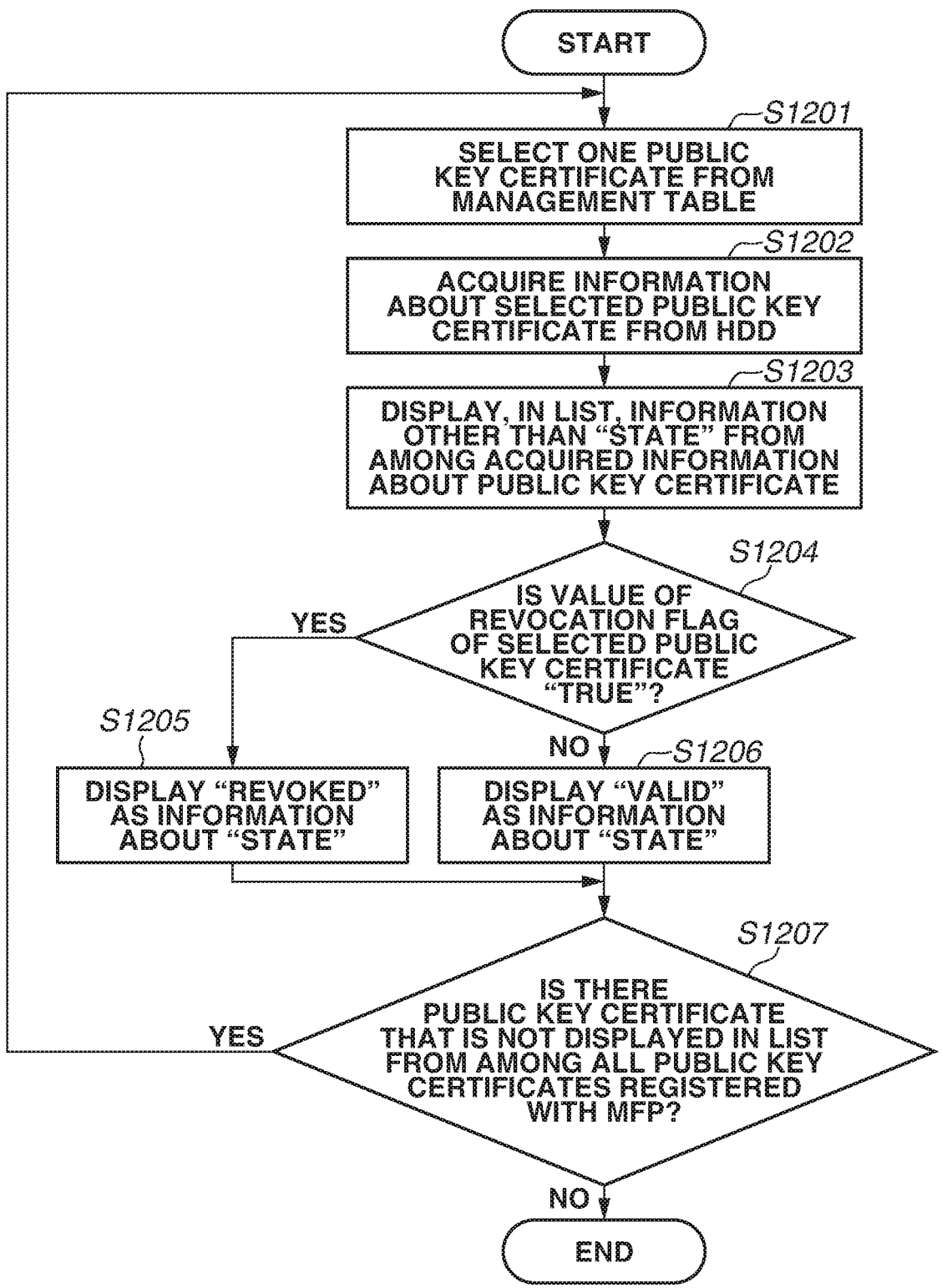
FIG. 12 is a flowchart illustrating an example of a control operation according to the first exemplary embodiment.

Next, processing for displaying a list of public key certificates registered with the MFP 100 on the display panel of the operation unit 210 is described with reference to FIGS. 11A and 11B and FIG. 12.

First, a list screen 1100 for public key certificates registered with the MFP 100 is described with reference to FIGS. 11A and 11B. A program for displaying the list screen 1100 on the display panel of the operation unit 210 is stored in the HDD 208. The administrator of the MFP 100 calls up the list screen 1100 via the operation unit 210 so as to confirm a list of public key certificates registered with the MFP 100. FIG. 11A illustrates an example of a list 1110 of public key certificates registered with the MFP 100. The information about public key certificates displayed in the list 1110 contains name 1101, usage 1102, issuer 1103, expiration date 1104, and state 1105.

Next, a series of processing steps performed until the information about public key certificates registered with the MFP 100 is displayed on the display panel of the operation unit 210 in the MFP 100 according to the first exemplary embodiment is described with reference to the flowchart of FIG. 12. This processing is performed by the CPU 205 executing a control program read from the ROM 207 or the HDD 208 and then loaded on the RAM 206. Moreover, a series of processing steps illustrated in FIG. 12 is started according to an instruction for displaying, on the display panel of the operation unit 210, information about public key certificates that are registered with the MFP 100 being received from the user. Alternatively, a modification example can be employed in which a series of processing steps illustrated in FIG. 12 is started according to the CPU 205 determining, in the above-mentioned step S303 illustrated in FIG. 3, that the public key certificate has been revoked (i.e., YES).

First, in step S1201, the CPU 205 selects one public key certificate from the management table 600 stored in the HDD 208.

Then, in step S1202, the CPU 205 acquires information about the public key certificate selected in step S1201 from the HDD 208.

Then, in step S1203, the CPU 205 displays, in the list 1110, information other than "state 1105" (i.e., for example, name 1101, usage 1102, issuer 1103, and expiration date 1104) from among the information about the public key certificate acquired in step S1202.

Then, in step S1204, the CPU 205 determines whether the value of the revocation flag 607 of the public key certificate selected in step S1201 is "TRUE" or "FALSE". If the CPU 205 determines that the value of the revocation flag 607 of the selected public key certificate is "TRUE" (YES in step S1204), then in step S1205, the CPU 205 displays "revoked" as information about "state 1105" in the list 1110. On the other hand, if the CPU 205 determines that the value of the revocation flag 607 of the public key certificate selected in step S1201 is "FALSE" (NO in step S1204), then in step S1206, the CPU 205 displays "valid" as information about "state 1105" in the list 1110.

Then, in step S1207, the CPU 205 determines whether there is a public key certificate that is not displayed in the list 1110 from among all the public key certificates registered with the MFP 100. If the CPU 205 determines that there is a public key certificate that is not displayed in the list 1110 (YES in step S1207), the processing returns to step S1201. On the other hand, if the CPU 205 determines that there is no public key certificate that is not displayed in the list 1110 (NO in step S1207), a series of processing steps illustrated in FIG. 12 ends.

As described above, in the first exemplary embodiment, a request for acquiring, from a certification authority, revocation information about digital certificates issued by the certification authority is transmitted to the certification authority according to an error occurring in performing communication with an external apparatus using a digital certificate retained by an information processing apparatus. For example, the MFP 100 attempts to perform secure communication with the server apparatus 120 using a public key certificate stored in the HDD 208, and receives an error notification indicative of communication denial from the server apparatus 120. Then, the MFP 100 transmits, to the certification authority 110, a request for acquiring revocation information about public key certificates issued by the certification authority 110, according to receiving the error notification indicative of communication denial from the server apparatus 120.

This enables the information processing apparatus to recognize that a digital certificate retained by the information processing apparatus has been revoked, without waiting until a next update timing for revocation information about digital certificates or without receiving an instruction for transmitting an acquisition request for revocation information about digital certificates. Furthermore, the administrator of the information processing apparatus is enabled to confirm that the cause of occurrence of an error in performing communication with an external apparatus using a digital certificate retained by the information processing apparatus is revocation of the digital certificate retained by the information processing apparatus.

Furthermore, in the first exemplary embodiment, to which the disclosure is applied, one of setting of "all the public key certificates that are retained by the MFP 100" and setting of "a public key certificate that is used during communication" is made selectable as the public key certificate targeted for revocation confirmation via the setting screen 700. More specifically, in a case where the setting of "all the public key certificates that are retained by the MFP 100" is selected as the public key certificate targeted for revocation confirmation, each of a plurality of public key certificates that are retained by the MFP 100 is targeted for revocation confirmation. As mentioned in the foregoing, in a case where a private key which is one key of a key pair of a public key certificate retained by the MFP 100 has been leaked to the outside of the MFP 100, another private key retained by the MFP 100 may also have been leaked similarly. Therefore, selecting the setting of "all the public key certificates that are retained by the MFP 100" as the target for revocation confirmation enables coping with the possibility that not only the public key certificate that is used during communication but also all the public key certificates that are retained by the MFP 100 may have been revoked by the certification authority 110.

Moreover, in the first exemplary embodiment, to which the disclosure is applied, when determining that a public key certificate stored in the HDD 208 has been revoked, the MFP 100 requests the certification authority 110 to issue a new public key certificate. This enables the MFP 100 to store the new public key certificate issued by the certification authority 110 into the HDD 208. At this time, the MFP 100 can delete the public key certificate that has been revoked and replace that public key certificate by the new public key certificate issued by the certification authority 110. Alternatively, without deleting the public key certificate that has been revoked, the MFP 100 can replace the usage of the public key certificate that has been revoked by the usage of the new public key certificate issued by the certification authority 110. This enables the MFP 100 to perform secure communication with the server apparatus 120 using the new public key certificate issued by the certification authority 110.

In the above-described first exemplary embodiment, an example of acquiring revocation information about public key certificates using SCEP and performing revocation confirmation processing for a public key certificate (step S400 in FIG. 3) is described.

Besides SCEP, the protocol used to confirm revocation information about public key certificates includes, for example, Online Certificate Status Protocol (OCSP). The OCSP is a communication protocol used for acquiring the revoked state of an X.509 public key certificate.

Here, the function of the OCSP is described. Moreover, in a second exemplary embodiment, the following description is made on the assumption that the certification authority 110 also functions as an OCSP server. In a case where the client (MFP 100) wants to confirm the revoked state of a public key certificate that is retained by the client, the client transmits a request for confirming the revoked state of the public key certificate to the OCSP server. Then, in response to reception of the request from the client, the OCSP server refers to revocation information that is retained by the OCSP server and determines the revoked state of the public key certificate. Then, the OCSP server transmits a response about the revoked state of the public key certificate to the client.

A revocation list of public key certificates acquired via SCEP is the one that is periodically issued by the certification authority 110. On the other hand, with the use of the OCSP, the MFP 100 is able to acquire latest revocation information about public key certificates from the certification authority 110. At this time, since the OCSP is used to acquire only revocation information from the certification authority 110, the OCSP enables efficiently performing revocation confirmation about public key certificates as compared with SCEP.

Figure 13:
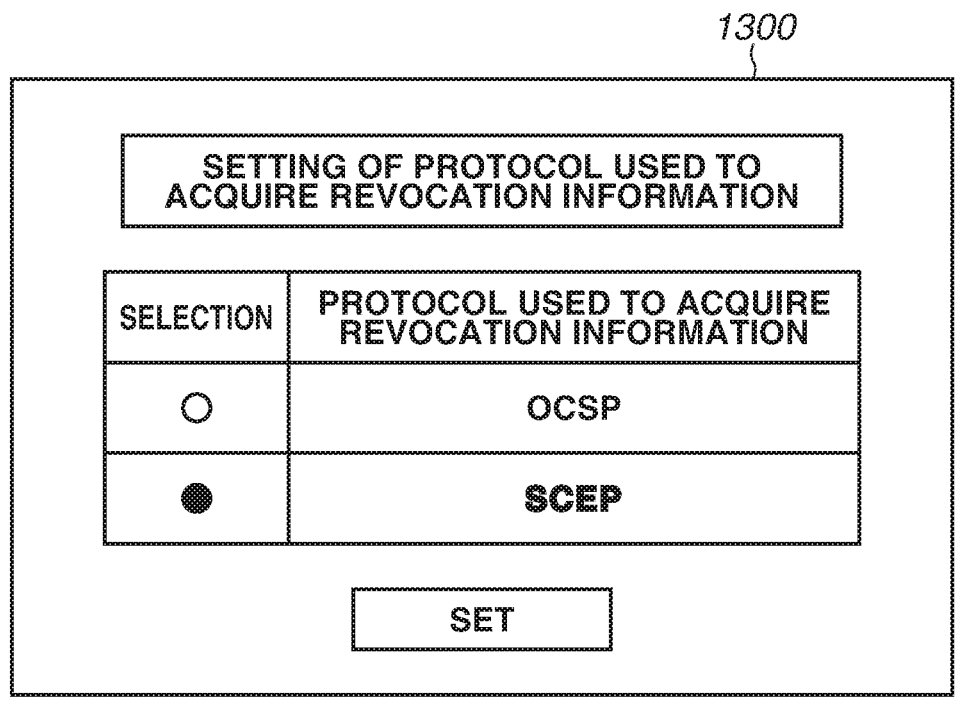
FIG. 13 illustrates a configuration of a screen according to a second exemplary embodiment.
Figure 15B:
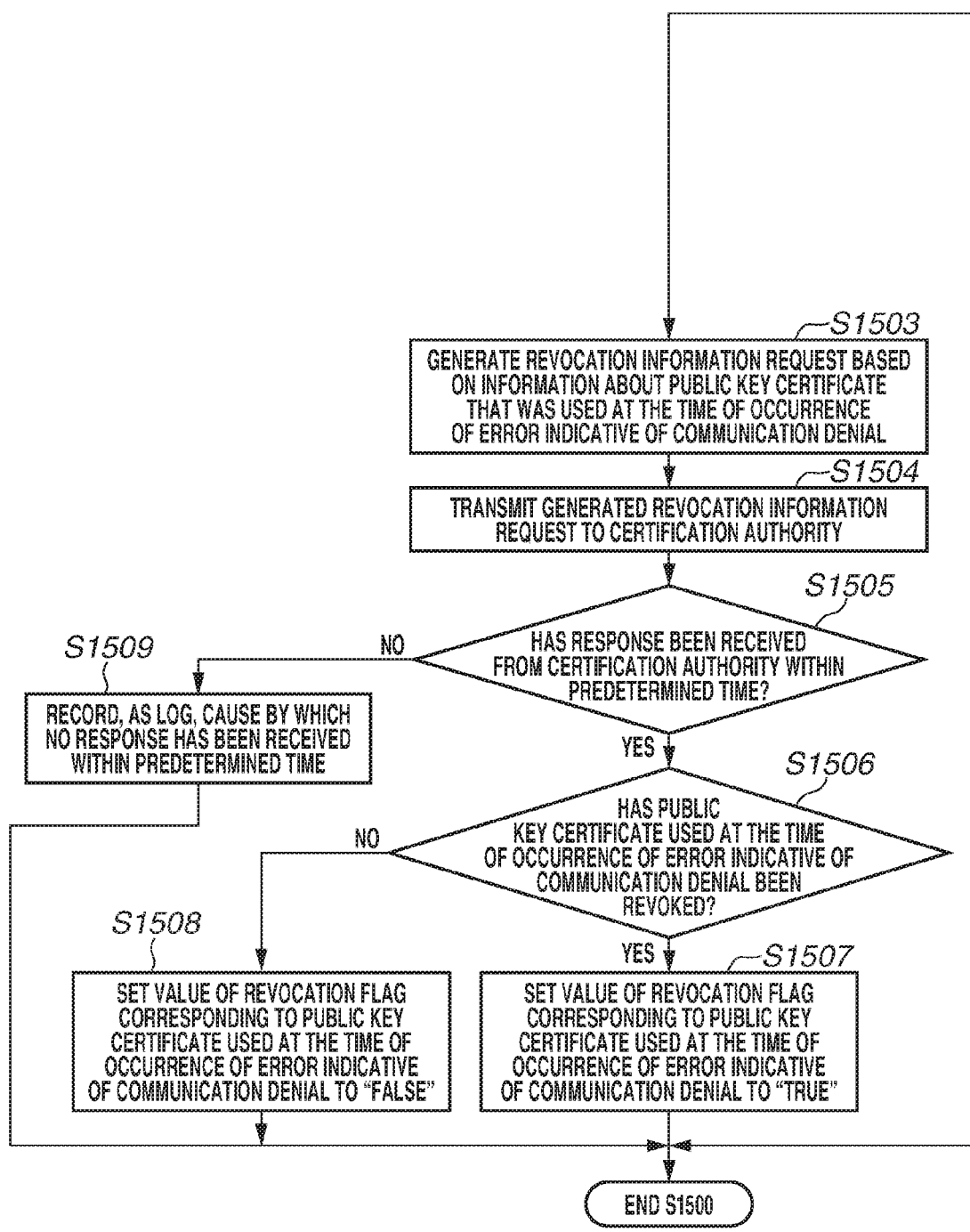
FIG. 15, which is composed of FIGS. 15A and 15B, is a flowchart illustrating an example of a control operation according to the second exemplary embodiment.

The second exemplary embodiment differs from the first exemplary embodiment in that the MFP 100 is provided with a screen used for allowing the user to specify a protocol used to acquire revocation information about public key certificates (a setting screen 1300 illustrated in FIG. 13).

The administrator of the MFP 100 calls up the setting screen 1300 via the operation unit 210 so as to select one of OCSP and SCEP as a protocol used to acquire revocation information about public key certificates, in consideration of the operation status of the MFP 100. Then, the administrator of the MFP 100 selects one protocol from OCSP and SCEP via the setting screen 1300 displayed on the display panel of the operation unit 210. At this time, the setting value of the selected protocol is stored into the HDD 208. Moreover, while FIG. 13 illustrates a case where one of OCSP and SCEP is selectable, via the setting screen 1300, as a protocol used to acquire revocation information about public key certificates, this is not limiting. For example, a modification example can be employed in which a protocol other than OCSP and SCEP is selectable via the setting screen 1300.

The MFP 100 according to the second exemplary embodiment differs from that of the first exemplary embodiment (the control example described above with reference to FIG. 3) in a part of a series of processing steps performed until a public key certificate that is retained by the MFP 100 is automatically updated. Therefore, a description is made with a focus on processing different from that of the first exemplary embodiment with reference to FIG. 14. Moreover, processing steps similar to those of the first exemplary embodiment are assigned the respective same step numbers, and the detailed description thereof is omitted.

If, in step S302 illustrated in FIG. 3, the CPU 205 determines that an error indicative of communication denial has occurred (YES in step S302), the processing proceeds to step S1401 illustrated in FIG. 14.

In step S1401, the CPU 205 acquires the setting value of a protocol used to acquire revocation information about public key certificates from the HDD 208.

Then, in step S1402, the CPU 205 determines whether the setting value of the protocol used to acquire revocation information about public key certificates is "SCEP" or "OCSP". If the CPU 205 determines that the setting value of the protocol used to acquire revocation information about public key certificates is "SCEP" (SCEP in step S1402), the processing proceeds to step S400. In step S400, the CPU 205 performs revocation confirmation processing for a public key certificate using SCEP. Furthermore, details of the processing in step S400 are described above with reference to FIG. 4. On the other hand, if the CPU 205 determines that the setting value of the protocol used to acquire revocation information about public key certificates is "OCSP" (OCSP in step S1402), the processing proceeds to step S1500. In step S1500, the CPU 205 performs revocation confirmation processing for a public key certificate using OCSP. Moreover, details of the processing in step S1500 are described below with reference to FIG. 15, which is composed of FIGS. 15A and 15B.

A series of processing steps performed until the revocation confirmation processing for a public key certificate using OCSP is performed in the MFP 100 according to the second exemplary embodiment is described with reference to the flowchart of FIG. 15. This processing is performed by the CPU 205 executing a control program read from the ROM 207 or the HDD 208 and then loaded on the RAM 206.

In step S1501, the CPU 205 acquires the setting value of a public key certificate targeted for revocation confirmation from the HDD 208. Here, the setting value of a public key certificate targeted for revocation confirmation is any one of "all the public key certificates that are retained by the MFP 100" and "a public key certificate that is used during communication", as mentioned above with reference to FIG. 7.

Then, in step S1502, the CPU 205 determines whether the target for revocation confirmation is "a public key certificate that is used during communication". If the CPU 205 determines that the target for revocation confirmation is "a public key certificate that is used during communication" (YES in step S1502), the processing proceeds to step S1503.

In step S1503, the CPU 205 generates a request for acquiring revocation information about public key certificates from the certification authority 110 (a revocation information request) based on information about a public key certificate that was used at the time of occurrence of an error indicative of communication denial. The revocation information request generated in step S1503 differs from the revocation information request generated in step S401 of the first exemplary embodiment in that the revocation information request generated in step S1503 is used to directly inquire of the OCSP server whether the public key certificate that was used at the time of occurrence of an error indicative of communication denial has been revoked. As described with reference to FIG. 4, the revocation information request generated in step S401 of the first exemplary embodiment is a request used to inquire about a list of serial numbers of public key certificates that have been revoked from among public key certificates signed by the certification authority 110 and issued by the certification authority 110.

Furthermore, in step S1503, to generate the revocation information request, the CPU 205 uses the serial number 610 of the public key certificate stored in the HDD 208. Then, the CPU 205 stores the generated revocation information request into the HDD 208.

Then, in step S1504, the CPU 205 transmits the revocation information request generated in step S1503 to the certification authority 110 via the network 130.

In step S1505, the CPU 205 determines whether a response has been received from the certification authority 110 within a predetermined time. As mentioned in the foregoing, in the second exemplary embodiment, the CPU 205 directly inquires of the OCSP server whether the public key certificate that was used at the time of occurrence of an error indicative of communication denial has been revoked. With this, the CPU 205 receives, from the OCSP server, a response indicating whether the public key certificate that was used at the time of occurrence of an error indicative of communication denial has been revoked.

The predetermined time as used herein is the maximum value of a time consumable to acquire the revocation information about public key certificates (a time determined by the specification of device setting of the MFP 100). If the CPU 205 determines that no response has been received from the certification authority 110 within the predetermined time (NO in step S1505), then in step S1509, the CPU 205 records, as a log, the cause by which no response has been received within the predetermined time. Moreover, such a log is stored into the HDD 208 or the RAM 206. Then, after the processing in step S1509, a series of processing steps illustrated in FIG. 15 ends, and the processing proceeds to step S303 in FIG. 14 (FIG. 3). On the other hand, if the CPU 205 determines that a response has been received from the certification authority 110 within the predetermined time (YES in step S1505), the processing proceeds to step S1506. In step S1506, the CPU 205 determines whether the public key certificate that was used at the time of occurrence of an error indicative of communication denial has been revoked.

If the CPU 205 determines that the public key certificate that was used at the time of occurrence of an error indicative of communication denial has been revoked (YES in step S1506), then in step S1507, the CPU 205 sets the value of the revocation flag 607 corresponding to the public key certificate that was used at the time of occurrence of the error to "TRUE" in the management table 600. Then, after the processing in step S1507, a series of processing steps illustrated in FIG. 15 ends, and the processing proceeds to step S303 in FIG. 14 (FIG. 3).

If the CPU 205 determines that the public key certificate that was used at the time of occurrence of an error indicative of communication denial has not been revoked (NO in step S1506), then in step S1508, the CPU 205 sets the value of the revocation flag 607 corresponding to the public key certificate that was used at the time of occurrence of the error to "FALSE" in the management table 600. Then, after the processing in step S1508, a series of processing steps illustrated in FIG. 15 ends, and the processing proceeds to step S303 in FIG. 14 (FIG. 3).

On the other hand, if, in step S1502, the CPU 205 determines that the setting value of the public key certificate targeted for revocation confirmation is not "a public key certificate that is used during communication" (NO in step S1502), the processing proceeds to step S1510.

In step S1510, the CPU 205 selects one of public key certificates that are not yet subjected to revocation confirmation from among all the public key certificates that are retained by the MFP 100. Then, in step S1511, the CPU 205 generates a request for acquiring revocation information about public key certificates from the certification authority 110 (a revocation information request) based on information about the public key certificate selected in step S1510. The revocation information request generated in step S1511 differs from the revocation information request generated in step S401 of the first exemplary embodiment in that the revocation information request generated in step S1511 is used to directly inquire of the OCSP server whether the public key certificate selected in step S1510 has been revoked. As described with reference to FIG. 4, the revocation information request generated in step S401 of the first exemplary embodiment is a request used to inquire about a list of serial numbers of public key certificates that have been revoked from among public key certificates signed by the certification authority 110 and issued by the certification authority 110.

Then, in step S1512, the CPU 205 transmits the revocation information request generated in step S1511 to the certification authority 110 via the network 130.

Then, in step S1513, the CPU 205 determines whether a response has been received from the certification authority 110 within a predetermined time. As mentioned in the foregoing, in the second exemplary embodiment, the CPU 205 directly inquires of the OCSP server whether the public key certificate selected in step S1510 has been revoked. With this, the CPU 205 receives, from the OCSP server, a response indicating whether the public key certificate selected in step S1510 has been revoked.

The predetermined time as used herein is the maximum value of a time consumable to acquire the revocation information about public key certificates (a time determined by the specification of device setting of the MFP 100). If the CPU 205 determines that no response has been received from the certification authority 110 within the predetermined time (NO in step S1513), then in step S1517, the CPU 205 records, as a log, the cause by which no response has been received within the predetermined time. Moreover, such a log is stored into the HDD 208 or the RAM 206. Then, after the processing in step S1517, the processing proceeds to step S1518. On the other hand, if the CPU 205 determines that a response has been received from the certification authority 110 within the predetermined time (YES in step S1513), the processing proceeds to step S1514.

In step S1514, the CPU 205 determines whether the public key certificate selected in step S1510 has been revoked. If the CPU 205 determines that the public key certificate selected in step S1510 has been revoked (YES in step S1514), then in step S1515, the CPU 205 sets the value of the revocation flag 607 corresponding to the public key certificate selected in step S1510 to "TRUE" in the management table 600. Then, after the processing in step S1515, the processing proceeds to step S1518. On the other hand, if the CPU 205 determines that the public key certificate selected in step S1510 has not been revoked (NO in step S1514), then in step S1516, the CPU 205 sets the value of the revocation flag 607 corresponding to the public key certificate selected in step S1510 to "FALSE" in the management table 600. Then, after the processing in step S1516, the processing proceeds to step S1518. In step S1518, the CPU 205 determines whether there is a public key certificate that is not yet subjected to revocation confirmation from among all the public key certificates that are retained by the MFP 100. If the CPU 205 determines that there is a public key certificate that is not yet subjected to revocation confirmation (YES in step S1518), the processing returns to step S1510. On the other hand, if revocation confirmation of all the public key certificates that are retained by the MFP 100 has been performed, in step S1518, the CPU 205 determines that the result is NO in step S1518, and then, a series of processing steps illustrated in FIG. 15 ends, so that the processing proceeds to step S303 in FIG. 14 (FIG. 3).

The above are details of a series of processing steps performed until the revocation confirmation processing for a public key certificate using OCSP is performed in the MFP 100 according to the second exemplary embodiment.

Furthermore, while, in the above-described control example illustrated in FIG. 15, the CPU 205 performs the revocation confirmation processing by acquiring information about public key certificates one by one until there becomes no public key certificate that is to be subjected to revocation confirmation, and generating a revocation information request about each public key certificate, this is not limiting. Information about a plurality of public key certificates that is to be subjective to revocation confirmation can be contained in a single revocation information request for public key certificates. In this case, a modification example can be employed in which the CPU 205 performs revocation confirmation of a plurality of public key certificates via a single set of revocation confirmation processing steps.

As described above, according to the second exemplary embodiment, in a case where OCSP is specified as a protocol used to acquire revocation information about public key certificates, revocation confirmation processing for a public key certificate can be performed with the use of OCSP. On the other hand, in a case where SCEP is specified as a protocol used to acquire revocation information about public key certificates, revocation confirmation processing for a public key certificate can be performed with the use of SCEP. In this way, the administrator of the MFP 100 is able to previously specify, via the setting screen 1300, one of OCSP and SCEP as a protocol used to acquire revocation information about public key certificates, in consideration of the operation status of the MFP 100.

In the above-described first exemplary embodiment and the above-described second exemplary embodiment, the timing at which revocation confirmation processing for a public key certificate is performed is the timing of occurrence of an error indicative of communication denial when the MFP 100 performs communication with the server apparatus 120. On the other hand, in terms of operating the MFP 100, the timing at which to acquire revocation information about public key certificates from the certification authority 110 can include, in addition to the time of occurrence of an error indicative of communication denial, the time after the MFP 100 is activated, the time before communication is performed with the server apparatus 120, and the time at which to set the usage of a public key certificate.

For example, in terms of operating the MFP 100, in a case where a public key certificate is seldom used to perform communication with the server apparatus 120, in one embodiment, revocation confirmation for a public key certificate be performed before communication is performed with the server apparatus 120. Moreover, for example, in a case where the MFP 100 enters a sleep state and the administrator of the MFP 100 restarts the MFP 100 at a rate of once per month, revocation confirmation for a public key certificate is performed after the MFP 100 is activated. Additionally, for example, in a case where the administrator of the MFP 100 sets the usage of a public key certificate registered with the MFP 100, and revocation confirmation for a public key certificate be performed at the same time. Furthermore, setting the usage of a public key certificate registered with the MFP 100 corresponds to specifying a protocol used to communicate with the server apparatus 120 using a public key certificate issued by the certification authority 110.

Therefore, in a third exemplary embodiment, a modification example in which revocation information about public key certificates is acquired at the timing other than the time of occurrence of an error indicative of communication denial, as the timing at which to acquire revocation information about public key certificates from the certification authority 110, is described as follows.

In the third exemplary embodiment, the user optionally selects a plurality of timings from among "after activation of the MFP 100", "before communication", "the time of occurrence of an error indicative of communication denial", and "the time of setting of the usage of a public key certificate", as acquisition timing of revocation information about public key certificates.

Figure 16:
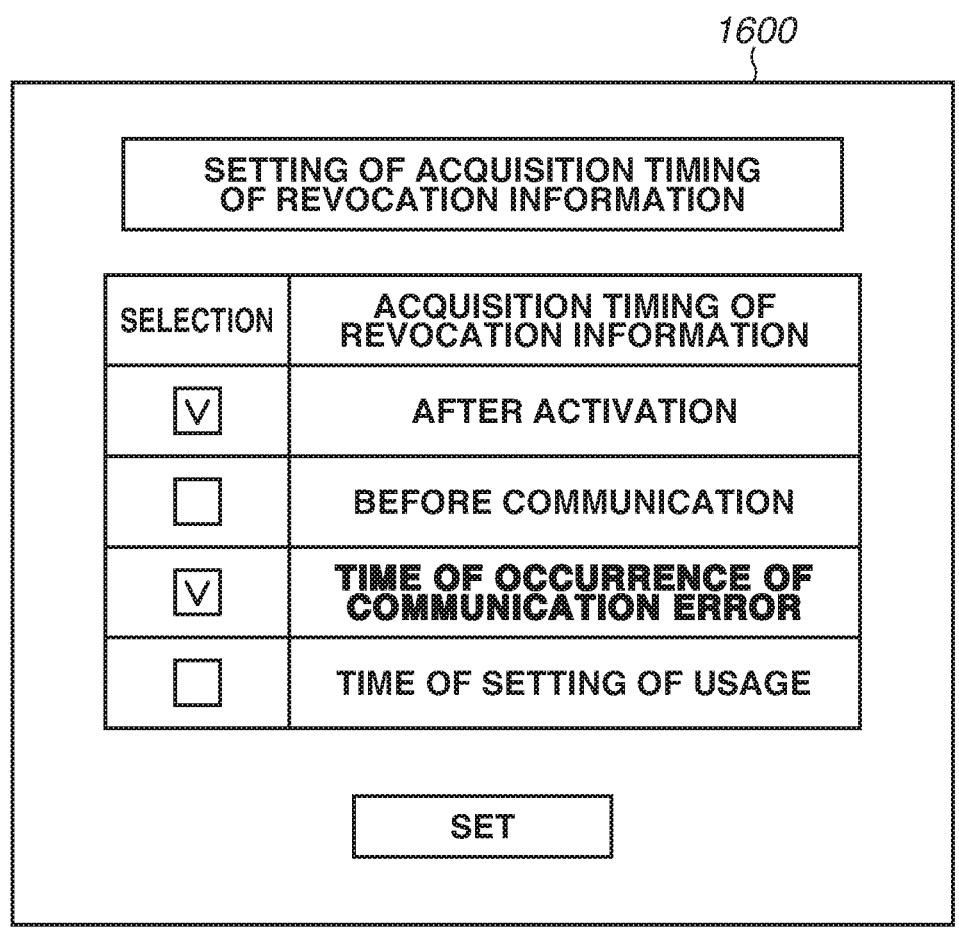
FIG. 16 illustrates a configuration of a screen according to a third exemplary embodiment.

To set the timing of acquiring revocation information about public key certificates, the administrator of the MFP 100 causes a setting screen 1600 illustrated in FIG. 16 to be displayed on the display panel of the operation unit 210. Then, the administrator of the MFP 100 sets the timing of acquiring revocation information about public key certificates via the setting screen 1600. The setting value of the timing of acquiring revocation information about public key certificates, which is set as described above, is stored into the HDD 208.

A control example in a case where "the time of occurrence of an error indicative of communication denial" has been selected as the acquisition timing of revocation information about public key certificates via the setting screen 1600 is described above with reference to FIG. 3.

On the other hand, in a case where "after activation of the MFP 100" has been selected as the acquisition timing of revocation information about public key certificates via the setting screen 1600, the following modification example can be employed. The CPU 205 can perform revocation confirmation processing for a public key certificate using SCEP (the above-described processing in step S400 in FIG. 4) in response to the MFP 100 being activated. More specifically, the CPU 205 determines whether the MFP 100 has been activated, instead of performing the processing in steps S301 and S302 illustrated in FIG. 3. Then, if the CPU 205 determines that the MFP 100 has been activated, the CPU 205 can perform revocation confirmation processing for a public key certificate using SCEP (step S400).

On the other hand, in a case where "before communication" has been selected as the acquisition timing of revocation information about public key certificates via the setting screen 1600, the following modification example can be employed. The CPU 205 can perform revocation confirmation processing for a public key certificate using SCEP (the above-described processing in step S400 in FIG. 4) in response to reception of an instruction for performing communication between the MFP 100 and the server apparatus 120 from the administrator of the MFP 100. More specifically, the CPU 205 determines whether an instruction for performing communication between the MFP 100 and the server apparatus 120 has been received from the MFP 100, instead of performing the processing in step S302 illustrated in FIG. 3. Then, if the CPU 205 determines that an instruction for performing communication between the MFP 100 and the server apparatus 120 has been received from the MFP 100, the CPU 205 can perform revocation confirmation processing for a public key certificate using SCEP (step S400).

On the other hand, in a case where "the time of setting of the usage" has been selected as the acquisition timing of revocation information about public key certificates via the setting screen 1600, the following modification example can be employed. The CPU 205 can perform revocation confirmation processing for a public key certificate using SCEP (the above-described processing in step S400 in FIG. 4) in response to reception of an instruction for communicating with the server apparatus 120. The instruction for communicating with the server apparatus 120 may be, for example, an instruction for receiving the setting of the usage of a public key certificate from the administrator of the MFP 100. More specifically, the CPU 205 determines whether an instruction for receiving the setting of the usage of a public key certificate has been received from the MFP 100, instead of performing the processing in step S302 illustrated in FIG. 3. Then, if the CPU 205 determines that an instruction for receiving the setting of the usage of a public key certificate has been received from the MFP 100, the CPU 205 can perform revocation confirmation processing for a public key certificate using SCEP (step S400).

Furthermore, in any of the acquisition timings of revocation information, a modification example can be employed in which revocation confirmation processing for a public key certificate using OCSP (the above-described processing in step S1500 in FIG. 15) is performed instead of revocation confirmation processing for a public key certificate using SCEP (step S400). Whether the processing proceeds to step S400 or step S1500 can be set by the user via the setting screen 1300 illustrated in FIG. 13.

As described above, in the third exemplary embodiment, a public key certificate retained by the MFP 100 can be automatically updated according to the MFP 100 being activated. Furthermore, a public key certificate retained by the MFP 100 can be automatically updated before communication with the server apparatus 120 is started. Moreover, a public key certificate retained by the MFP 100 can be automatically updated according to the occurrence of an error indicative of communication denial. Additionally, a public key certificate retained by the MFP 100 can be automatically updated before an execution of a communication with the server apparatus 120. For example, a public key certificate retained by the MFP 100 can be automatically updated according to the setting of the usage of a public key certificate.

In this way, the administrator of the MFP 100 is able to previously specify, via the setting screen 1600, one of, for example, the time after activation of the MFP 100, the time before communication, the time of a communication error, and the time of setting of the usage of a public key certificate as the acquisition timing of revocation information about public key certificates, in consideration of the operation status of the MFP 100.

The disclosure should not be construed to be limited to the above-described exemplary embodiments, but can be modified in various manners (including an organic combination of some of the exemplary embodiments) based on the gist of the disclosure, and such modifications should not be construed to be excluded from the scope of the aspect of the embodiments.

For example, while, in the exemplary embodiments, the CPU 205 of the controller unit 200 of the MFP 100 serves as the subject of the above-described various control operations, the disclosure is not limited to this. For example, a print control apparatus that is provided separately from the MFP 100, such as an external controller, can be configured to be able to perform a part or all of the above-described various control operations.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-232512 filed Nov. 28, 2015, which is hereby incorporated by reference herein in its entirety.

What is claimed is:

1. An apparatus comprising:
a memory device that stores a set of instructions; and
at least one processor that executes the instructions to:
perform control to cause a storage unit to store a digital certificate issued by a certification authority;
release a public key whose validity is certified by the issued digital certificate and perform encrypted communication with an external apparatus using the public key;
transmit, to the certification authority, an acquisition request for revocation information about the issued digital certificate in a case where a predetermined condition is satisfied, the revocation information being information on whether the issued digital certificate used in performing the encrypted communication with the external apparatus has been revoked;
receive, from the certification authority, revocation information about issued digital certificate based on the acquisition request having been transmitted to the certification authority;
generate at least a public key that is used for the encrypted communication based on confirming that the issued digital certificate used in performing the encrypted communication has been revoked from the received revocation information;
acquire a new digital certificate associated with the generated public key from the certification authority; and
cause the storage unit to store the acquired new digital certificate.

2. The apparatus according to claim 1, wherein the predetermined condition is satisfied in a case where an error has occurred during communication.

3. The apparatus according to claim 1, wherein the predetermined condition is satisfied in a case where the apparatus has started activation processing.

4. The apparatus according to claim 1, wherein the stored instructions further include instructions to:
determine whether a issued digital certificate stored in the storage unit has been revoked, based on the received revocation information.

5. The apparatus according to claim 4, wherein the stored instructions further include instructions to:
acquire a new digital certificate issued by the certification authority based on determining that the digital certificate used in performing the encrypted communication has been revoked; and
cause the storage unit to store the acquired new digital certificate.

6. The apparatus according to claim 4, wherein the stored instructions further include instructions to notify the user that a digital certificate stored in the storage unit has been revoked based on determining that the issued digital certificate stored in the storage unit has been revoked.

7. The apparatus according to claim 4, wherein the stored instructions further include instructions to cause a display unit to display an indication indicating that a digital certificate stored in the storage unit has been revoked, in association with the digital certificate stored in the storage unit, based on determining that the issued digital certificate stored in the storage unit has been revoked.

8. The apparatus according to claim 1, wherein the stored instructions further include instructions to:
determine, based on setting performed by a user, whether to perform processing for determining whether the issued digital certificate used in performing the encrypted communication with the external apparatus has been revoked, based on the received revocation information, or perform processing for determining whether each of a plurality of issued digital certificates stored in the storage unit has been revoked, based on the received revocation information.

9. The apparatus according to claim 1, wherein the external apparatus encrypts communication data using the public key released by the apparatus.

10. The apparatus according to claim 1, wherein the issued digital certificate certifies that the public key is the one released by the apparatus.

11. A method for an information processing apparatus comprising:
performing control to cause a storage unit to store a digital certificate issued by a certification authority;
releasing a public key whose validity is certified by the issued digital certificate and performing encrypted communication with an external apparatus using the public key;
transmitting, to the certification authority, an acquisition request for revocation information about the issued digital certificate in a case where a predetermined condition is satisfied, the revocation information being information on whether the issued digital certificate used in performing the encrypted communication with the external apparatus has been revoked;

receiving, from the certification authority, revocation information about issued digital certificate based on the acquisition request having been transmitted to the certification authority;

generating at least a public key that is used for the encrypted communication based on confirming that the issued digital certificate used in performing the encrypted communication has been revoked from the received revocation information;

acquiring a new digital certificate associated with the generated public key from the certification authority; and causing the storage unit to store the acquired new digital certificate.

12. The method according to claim 11, wherein the predetermined condition is satisfied in a case where an error has occurred during communication or in the case where the apparatus has started activation processing.

13. The method according to claim 11, wherein the stored instructions further include instructions to:

determine whether an issued digital certificate used in performing the encrypted communication with the external apparatus has been revoked, based on the received revocation information.

14. A non-transitory computer-readable storage medium storing computer-executable instructions that, when executed by a computer, cause the computer to perform a method the method comprising:

performing control to cause a storage unit to store a digital certificate issued by a certification authority;

releasing a public key whose validity is certified by the issued digital certificate and performing encrypted communication with an external apparatus using the public key;

transmitting, to the certification authority, an acquisition request for revocation information about the issued digital certificates in a case where a predetermined condition is satisfied, the revocation information being information on whether the issued digital certificate used in performing the encrypted communication with the external apparatus has been revoked;

receiving, from the certification authority, revocation information about issued digital certificate based on the acquisition request having been transmitted to the certification authority;

generating at least a public key that is used for the encrypted communication based on confirming that the issued digital certificate used in performing the encrypted communication has been revoked from the received revocation information;

acquiring a new digital certificate associated with the generated public key from the certification authority; and causing the storage unit to store the acquired new digital certificate.

15. The non-transitory computer-readable storage medium according to claim 14, wherein the predetermined condition is satisfied in a case where an error has occurred during communication or in the case where the apparatus has started activation processing.

16. The non-transitory computer-readable storage medium according to claim 14, further comprising:

determining whether an issued digital certificate used in performing the encrypted communication with the external apparatus has been revoked, based on the received revocation information.

* * * * *